US010324718B2

(12) United States Patent
Ould-Ahmed-Vall et al.

(10) Patent No.: US 10,324,718 B2
(45) Date of Patent: *Jun. 18, 2019

(54) PACKED ROTATE PROCESSORS, METHODS, SYSTEMS, AND INSTRUCTIONS

(71) Applicant: Intel Corporation, Santa Clara, CA (US)

(72) Inventors: Elmoustapha Ould-Ahmed-Vall, Chandler, AZ (US); Robert Valentine, Kiryat Tivon (IL); Jesus Corbal San Andrian, King City, OR (US); Suleyman Sair, Phoenix, AZ (US); Bret L. Toll, Hillsboro, OR (US); Zeev Sperber, Zichron Yackov (IL); Amit Gradstein, Binyamina (IL); Asaf Rubinstein, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,158

(22) Filed: Jan. 8, 2018

(65) Prior Publication Data

US 2018/0253308 A1 Sep. 6, 2018

Related U.S. Application Data

(63) Continuation of application No. 13/977,229, filed as application No. PCT/US2011/068242 on Dec. 30, 2011, now Pat. No. 9,864,602.

(51) Int. Cl.
*G06F 9/30* (2018.01)
(52) U.S. Cl.
CPC ...... *G06F 9/30032* (2013.01); *G06F 9/30036* (2013.01)

(58) Field of Classification Search
None
See application file for complete search history.

(56) References Cited

U.S. PATENT DOCUMENTS 4,656,581 A 4/1987 Ohwada
5,675,526 A 10/1997 Peleg et al.
(Continued)

FOREIGN PATENT DOCUMENTS

CN 1391668 A 1/2003
CN 1610880 A 4/2005
(Continued)

OTHER PUBLICATIONS

Communication pursuant to Article 94(3) EPC for Application No. 11878881.9, dated Jul. 13, 2018, 4 pages.
(Continued)

*Primary Examiner* — Corey S Faherty
(74) *Attorney, Agent, or Firm* — NDWE, LLP

(57) ABSTRACT

A method of an aspect includes receiving a masked packed rotate instruction. The instruction indicates a first source packed data including a plurality of packed data elements, a packed data operation mask having a plurality of mask elements, at least one rotation amount, and a destination storage location. A result packed data is stored in the destination storage location in response to the instruction. The result packed data includes result data elements that each correspond to a different one of the mask elements in a corresponding relative position. Result data elements that are not masked out by the corresponding mask element include one of the data elements of the first source packed data in a corresponding position that has been rotated. Result data elements that are masked out by the corresponding mask element include a masked out value. Other methods, apparatus, systems, and instructions are disclosed.

19 Claims, 26 Drawing Sheets

(56) References Cited

U.S. PATENT DOCUMENTS

| | | |
|---|---|---|
| 5,781,457 A | 7/1998 | Cohen et al. |
| 5,822,606 A | 10/1998 | Morton |
| 5,838,984 A | 11/1998 | Nguyen et al. |
| 6,098,087 A | 8/2000 | Lemay |
| 6,629,115 B1 | 9/2003 | Rossignol |
| 7,159,100 B2 | 1/2007 | van Hook et al. |
| 7,461,109 B2 | 12/2008 | Lin et al. |
| 7,779,229 B2 | 8/2010 | Drescher |
| 9,864,602 B2 | 1/2018 | Ould-Ahmed-Vall et al. |
| 2003/0023646 A1 | 1/2003 | Lin et al. |
| 2005/0071583 A1 | 3/2005 | Shepherd |
| 2007/0106882 A1 | 5/2007 | Thornton |
| 2007/0124631 A1 | 5/2007 | Boggs et al. |

FOREIGN PATENT DOCUMENTS

| | | |
|---|---|---|
| CN | 1688966 A | 10/2005 |
| CN | 101911014 A | 12/2010 |
| CN | 101911015 A | 12/2010 |
| EP | 1693742 A2 | 8/2006 |
| TW | 309605 B | 7/1997 |
| TW | 310406 B | 7/1997 |
| TW | I220732 B | 9/2004 |
| WO | 9708608 A1 | 3/1997 |
| WO | 2013101232 A1 | 7/2013 |

OTHER PUBLICATIONS

Extended European Search Report for Application No. 11878881.9, dated Jul. 14, 2016, 6 pages.
Final Office Action from U.S. Appl. No. 13/977,229, dated Jun. 7, 2016, 8 pages.
International Preliminary Report on Patentability for Application No. PCT/US2011/068242, dated Jul. 10, 2014, 7 pages.
International Search Report and Written Opinion for Application No. PCT/US2011/068242, dated Sep. 25, 2012, 10 pages.
Non-Final Office Action from U.S. Appl. No. 13/977,229, dated Dec. 10, 2015, 17 pages.
Notice of Allowance from foreign counterpart Taiwan Patent Application No. 101148747, dated Apr. 20, 2016, 2 pages.
Notice of Allowance from foreign counterpart Chinese Patent Application No. 201180075974.0, dated Jul. 10, 2017, 4 pages.
Notice of Allowance from foreign counterpart Taiwan Patent Application No. 105115811, dated Apr. 26, 2018, 2 pages.
Notice of Allowance from U.S. Appl. No. 13/977,229, dated Aug. 25, 2017, 16 pages.
Office Action and Search Report from foreign counterpart Taiwan Patent Application No. 105115811, dated Sep. 18, 2017, 22 pages.
Office Action from foreign counterpart Chinese Patent Application No. 201180075974.0, dated Jul. 11, 2014, 2 pages.
Office Action from foreign counterpart Chinese Patent Application No. 201180075974.0, dated Sep. 9, 2016, 24 pages.
Office Action from foreign counterpart Taiwan Patent Application No. 101148747, dated Aug. 14, 2015, 8 pages.
Restriction Requirement from U.S. Appl. No. 13/977,229, dated Sep. 4, 2015, 7 pages.
Communication under rule 71(3) EPC for Application No. 11878881.9, dated Feb. 12, 2019, 7 pages.

FIG. 10

MASKED PACKED ROTATE WITH DATA ELEMENT BROADCAST INSTRUCTION 1006

| OPCODE | FIRST SOURCE SPECIFIER | SECOND SOURCE SPECIFIER (OPTIONAL) | DESTINATION SPECIFIER | DATA ELEMENT BROADCAST CONTROL (OPTIONAL) | PACKED DATA OPERATION MASK SPECIFIER (OPTIONAL) | TYPE OF MASKING OPERATION SPECIFIER (OPTIONAL) |
|---|---|---|---|---|---|---|
| 1045 | 1046 | 1047 | 1048 | 1049 | 1050 | 1051 |

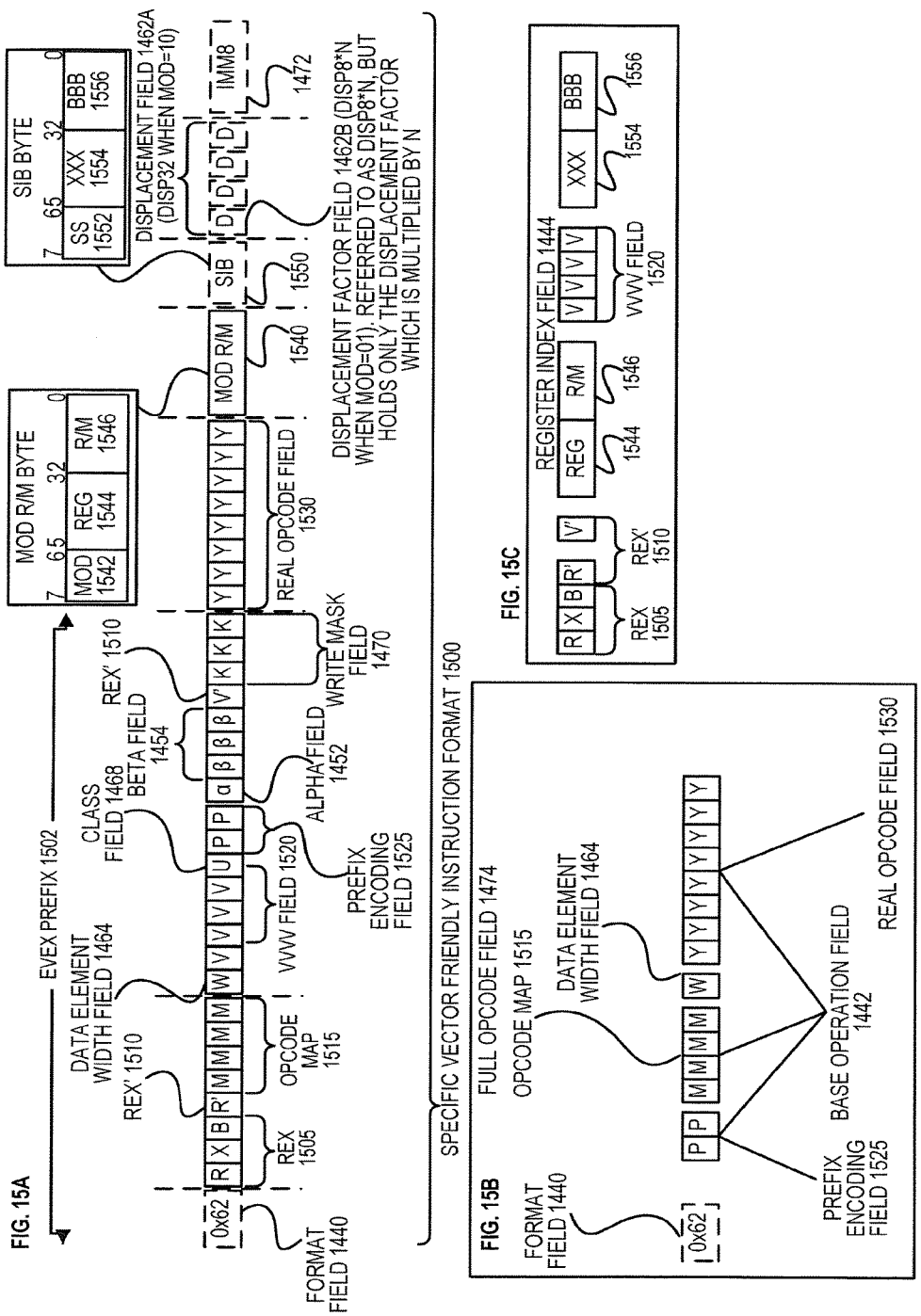

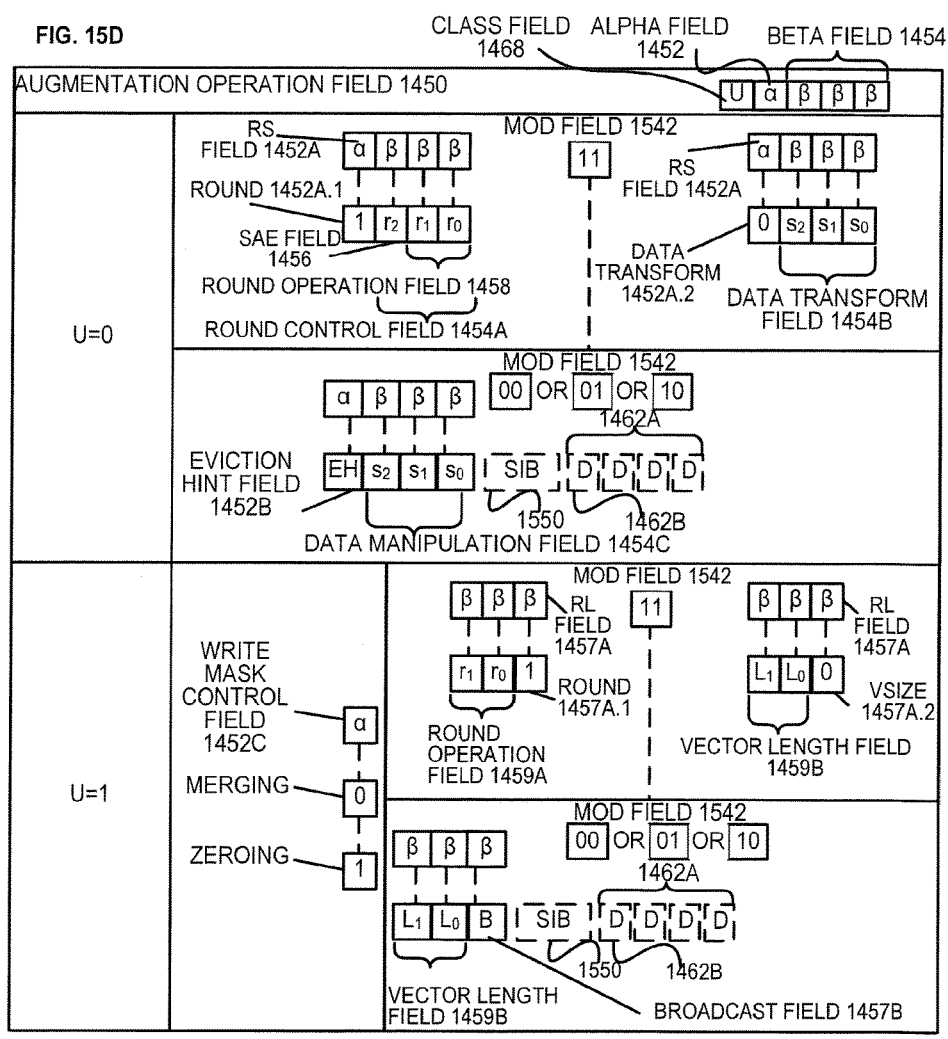

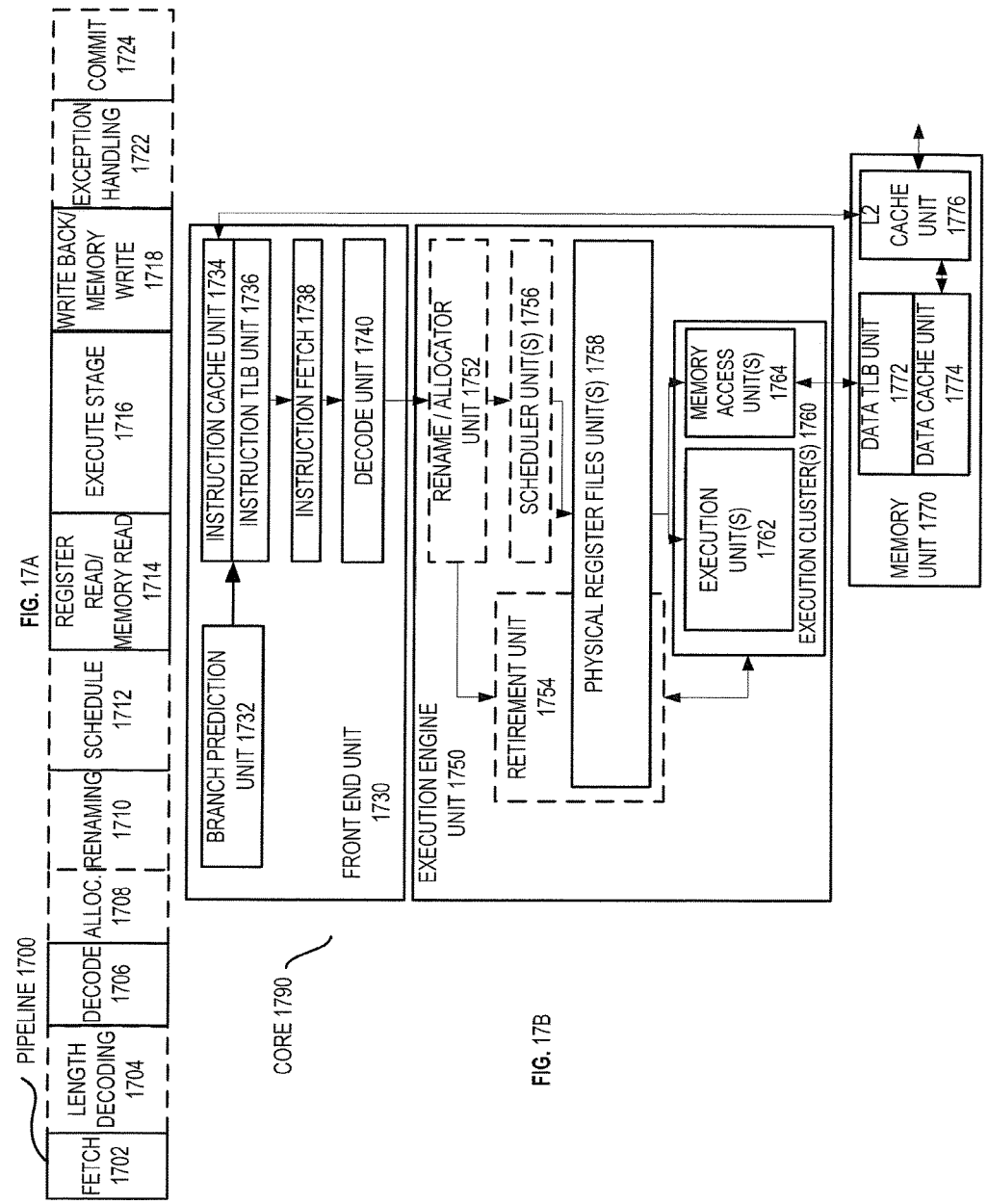

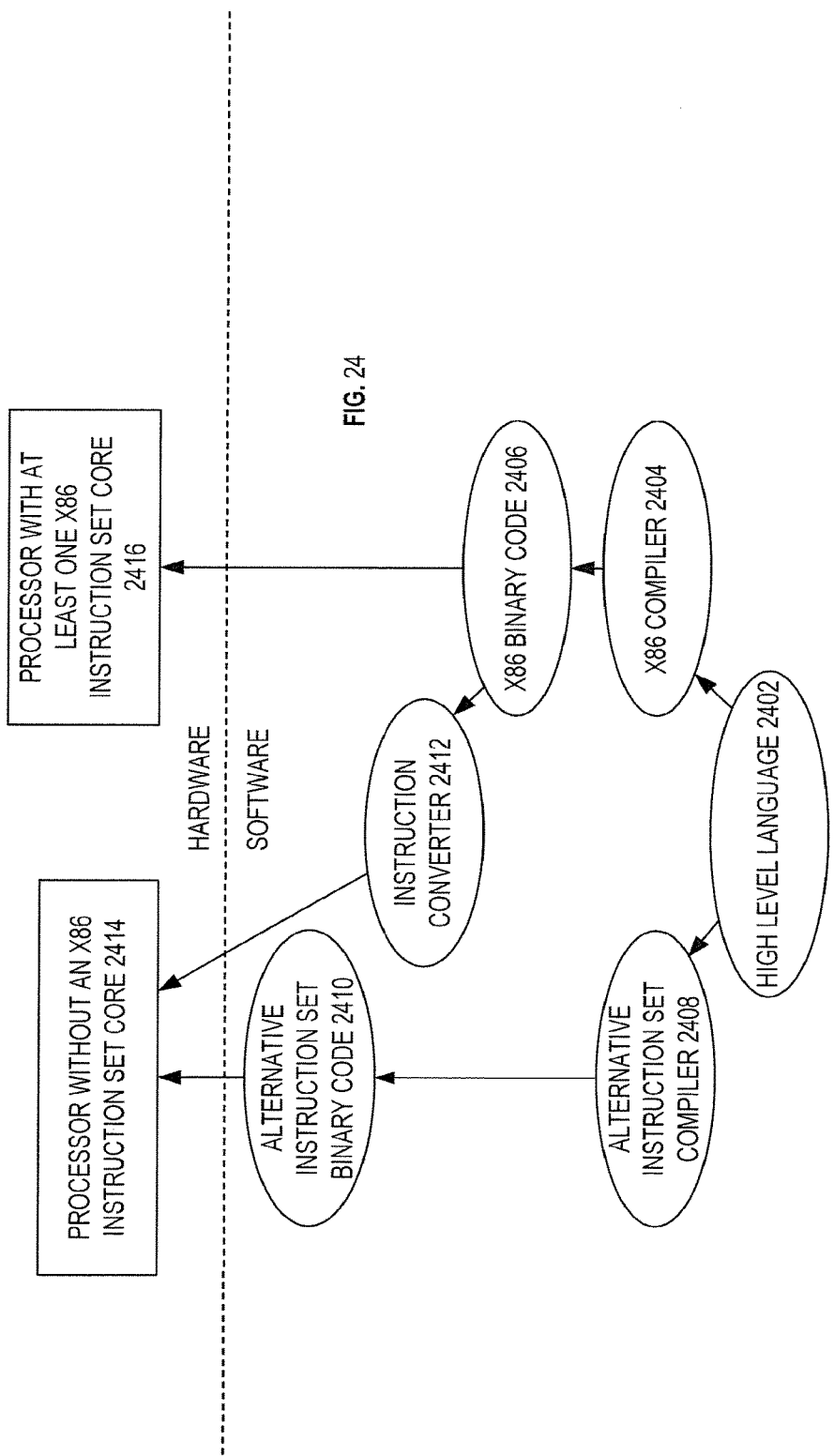

PACKED ROTATE PROCESSORS, METHODS, SYSTEMS, AND INSTRUCTIONS

RELATED APPLICATIONS

This application is a Continuation of U.S. patent application Ser. No. 13/977,229, filed on Jun. 28, 2013, entitled as "PACKED ROTATE PROCESSORS, METHODS, SYSTEMS, AND INSTRUCTIONS", which is a U.S. National Phase Application under 35 U.S.C. § 371 of International Application No. PCT/US2011/068242, filed on Dec. 30, 2011, which is hereby incorporated herein by this reference in its entirety and for all purposes.

BACKGROUND

Field

Embodiments relate to processors. In particular, embodiments relate to processors to perform packed rotate operations responsive to packed rotate instructions.

Background Information

Many processors have Single Instruction, Multiple Data (SIMD) architectures. In SIMD architectures, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

Multiple data elements may be packed within one register or memory location as packed data or vector data. In packed data, the bits of the register or other storage location may be logically divided into a sequence of data elements. For example, a 256-bit wide packed data register may have four 64-bit wide data elements, eight 32-bit data elements, sixteen 16-bit data elements, etc. Each of the data elements may represent a separate individual piece of data (e.g., a pixel color, a component of a complex number, etc.), which may be operated upon separately and/or independently of the others.

BRIEF DESCRIPTION OF THE SEVERAL VIEWS OF THE DRAWINGS

The invention may best be understood by referring to the following description and accompanying drawings that are used to illustrate embodiments. In the drawings:

FIG. 10 is a block diagram of an embodiment of an instruction format for a masked packed rotate with data element broadcast instruction.

FIG. 15A is a block diagram illustrating an exemplary specific vector friendly instruction format according to embodiments of the invention.

FIG. 15B is a block diagram illustrating the fields of the specific vector friendly instruction format that make up the full opcode field according to one embodiment of the invention.

FIG. 15C is a block diagram illustrating the fields of the specific vector friendly instruction format that make up the register index field according to one embodiment of the invention.

FIG. 15D is a block diagram illustrating the fields of the specific vector friendly instruction format that make up the augmentation operation field according to one embodiment of the invention.

FIG. 17A is a block diagram illustrating both an exemplary in-order pipeline and an exemplary register renaming, out-of-order issue/execution pipeline according to embodiments of the invention.

FIG. 17B shows processor core including a front end unit coupled to an execution engine unit, and both are coupled to a memory unit.

FIG. 24 is a block diagram contrasting the use of a software instruction converter to convert binary instructions in a source instruction set to binary instructions in a target instruction set according to embodiments of the invention.

DETAILED DESCRIPTION

Disclosed herein are packed rotate instructions, processors to execute the packed rotate instructions, methods performed by the processors when processing or executing the packed rotate instructions, and systems incorporating one or more processors to process or execute the packed rotate instructions. In the following description, numerous specific details are set forth (e.g., specific processor configurations, sequences of operations, instruction formats, data formats, specific system configurations, microarchitectural details, etc.). However, embodiments may be practiced without these specific details. In other instances, well-known circuits, structures and techniques have not been shown in detail to avoid obscuring the understanding of the description.

Figure 1:
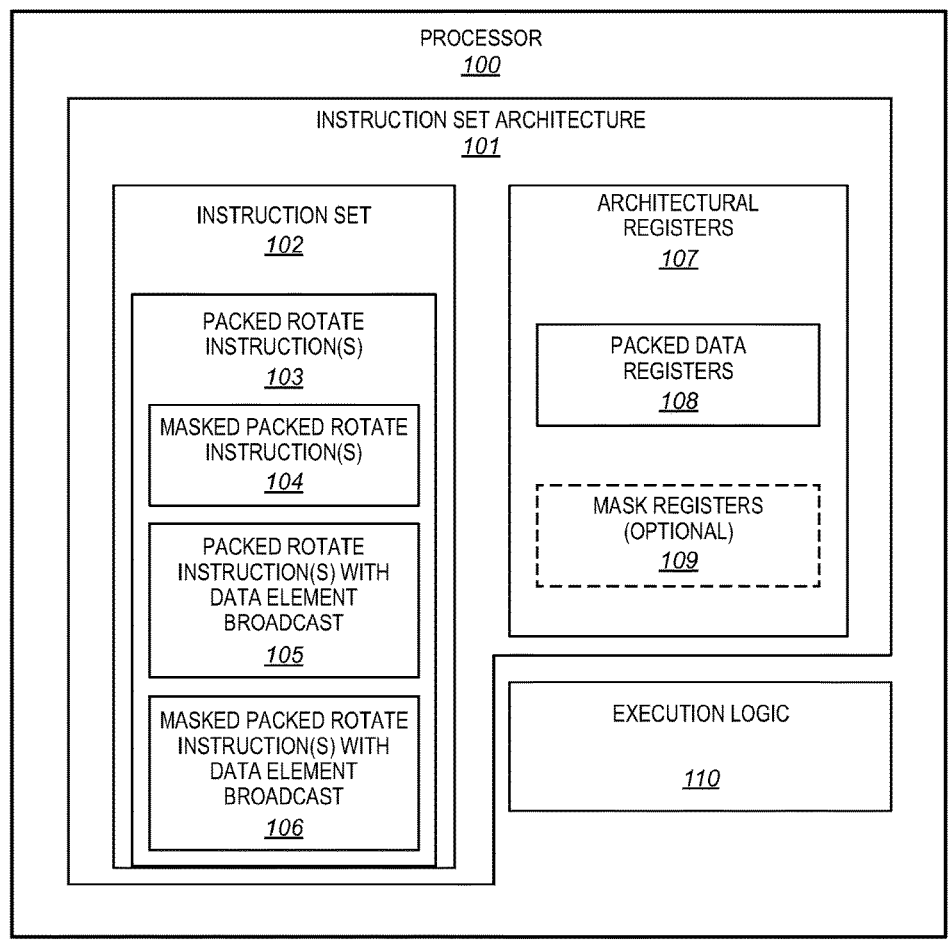
FIG. 1 is a block diagram of an example embodiment of a processor having an instruction set including one or more packed rotate instructions.

FIG. 1 is a block diagram of an example embodiment of a processor 100 having an instruction set 102 including one or more packed rotate instructions 103. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., a general-purpose microprocessor of the type used in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor has an instruction set architecture (ISA) 101. The ISA represents a part of the architecture of the processor related to programming. The ISA commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the ISA. Processors with different microarchitectures may share a common ISA.

The ISA includes architecturally-visible registers (e.g., an architectural register file) 107. The architectural registers generally represent on-die processor storage locations. The architectural registers may also be referred to herein simply as registers. Unless otherwise specified or apparent, the phrases architectural register, register file, and register are used herein to refer to registers that are visible to the software and/or programmer (e.g., software-visible) and/or the registers that are specified by general-purpose macroinstructions to identify operands. These registers are contrasted to other non-architectural or non-architecturally visible registers in a given microarchitecture (e.g., temporary registers used by instructions, reorder buffers, retirement registers, etc.). The illustrated architectural registers include packed data registers 108. Each of the packed data registers is operable to store packed data, vector data, or SIMD data. In some embodiments, the architectural registers may optionally include packed data operation mask registers, also referred to simply as mask registers, 109.

The illustrated ISA includes the instruction set 102 that is supported by the processor. The instructions of the instruction set represent macroinstructions (e.g., instructions provided to the processor for execution), as opposed to microinstructions or micro-ops (e.g., those which result from a decoder of the processor decoding macroinstructions). The instruction set includes one or more packed rotate instructions 103. In some embodiments, the packed rotate instructions may include one or more masked packed rotate instructions 104. In some embodiments, the packed rotate instructions may include one or more packed rotate instructions with data element broadcast 105. In some embodiments, the packed rotate instructions may include one or more masked packed rotate instructions with data element broadcast 106. Various different embodiments of these different types of packed rotate instructions will be disclosed further below.

The processor also includes execution logic 110. The execution logic is operable to execute or process the instructions of the instruction set (e.g., the packed rotate instructions 104).

Figure 2:
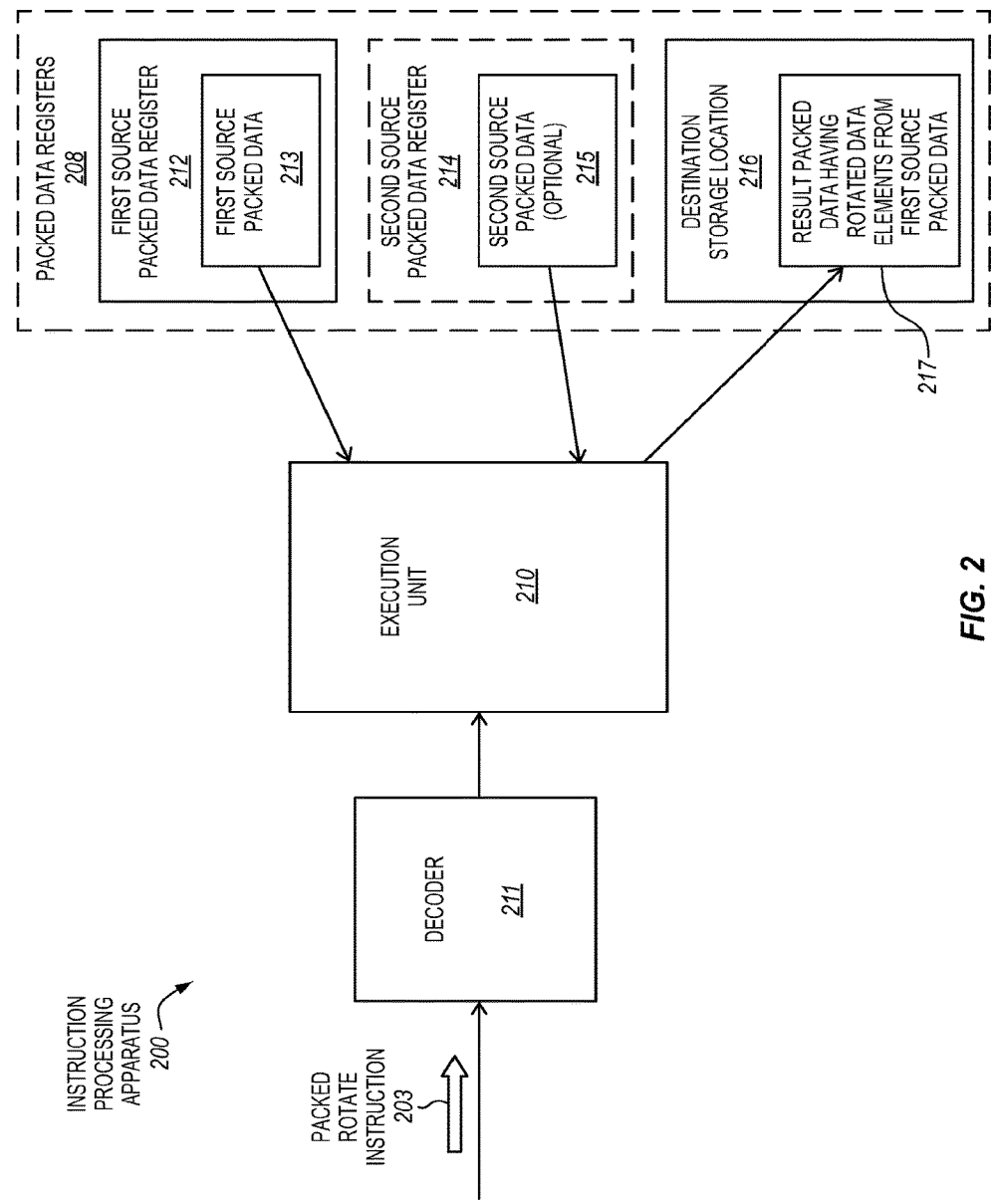
FIG. 2 is a block diagram of an example embodiment of an instruction processing apparatus having an execution unit that is operable to execute instructions including an example embodiment of a packed rotate instruction.

FIG. 2 is a block diagram of an example embodiment of an instruction processing apparatus 200 having an execution unit 210 that is operable to execute instructions including an example embodiment of a packed rotate instruction 203. In some embodiments, the instruction processing apparatus may be a processor and/or may be included in a processor. For example, in some embodiments, the instruction processing apparatus 200 may be, or may be included in, the processor 100 of FIG. 1, or one similar. Alternatively, the instruction processing apparatus may be included in a different processor, or electronic system.

The instruction processing apparatus 200 may receive the packed rotate instruction 203. For example, the instruction may be received from an instruction fetch unit, an instruction queue, or a memory. The packed rotate instruction may represent a machine instruction, macroinstruction, or control signal that is recognized by the instruction processing apparatus and that controls the apparatus to perform a particular operation. The packed rotate instruction may explicitly specify (e.g., through bits or one or more fields) or otherwise indicate (e.g., implicitly indicate) a first source packed data 213, in some embodiments may optionally specify or otherwise indicate a second source packed data 215, and may specify or otherwise indicate a destination storage location 216 where a result packed data 217 having rotate data elements from the first source packed data is to be stored. As shown, in some embodiments, the first source packed data 213 may be stored in a first source packed data register 212, the second source packed data 215 may be stored in a second source packed data register 214, the result 217 may be stored in a destination or third packed data register 216. Alternatively, memory locations or other storage locations suitable for packed data may be used for any of these operands.

The illustrated instruction processing apparatus includes an instruction decode unit or decoder 210. The decoder may receive and decode higher-level machine instructions or macroinstructions (e.g., the packed rotate instruction 203), and output one or more lower-level micro-operations, micro-code entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

In other embodiments, instead of having the decoder 211, an instruction emulator, translator, morpher, interpreter, or other instruction conversion logic may be used. Various different types of instruction conversion logic are known in the arts and may be implemented in software, hardware, firmware, or a combination thereof. The instruction conversion logic may receive the instruction, emulate, translate, morph, interpret, or otherwise convert the received instruction into one or more corresponding derived instructions or control signals. In still other embodiments, both instruction conversion logic and a decoder may be used. For example, the apparatus may have instruction conversion logic to convert the received instruction into one or more intermediate instructions, and a decoder to decode the one or more intermediate instructions into one or more lower-level instructions or control signals executable by native hardware of the instruction processing apparatus. Some or all of the instruction conversion logic may be located off-die from the rest of the instruction processing apparatus, such as on a separate die or in an off-die memory.

The instruction processing apparatus also includes a set of packed data registers 208. The packed data registers may represent architectural on-processor (e.g., on-die) processor storage locations that are each operable to store packed data or vector data. The packed data registers may be implemented in different ways in different microarchitectures using well-known techniques, and are not limited to any particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

Referring again to FIG. 2, the execution unit 210 is coupled with the packed data registers 208. The execution unit is also coupled with the decoder 211. The execution unit may receive from the decoder one or more micro-operations, micro-code entry points, microinstructions, other instructions, or other control signals, which reflect, or are derived from, the packed rotate instruction 203.

The execution unit 210 is operable, in response to and/or as a result of the packed rotate instruction 203 (e.g., in response to one or more control signals derived from the instruction 203) to store a result packed data 217 in the destination storage location 216. As previously mentioned, the packed rotate instruction may explicitly specify (e.g., through bits or one or more fields) or otherwise indicate (e.g., implicitly indicate) the first source packed data 213, in some embodiments may optionally specify or otherwise indicate the second source packed data 215, and may specify or otherwise indicate the destination storage location 216 where the result packed data 217 having rotate data elements from the first source packed data is to be stored.

By way of example, the execution unit may include an arithmetic logic unit, a logic unit, an execution unit or functional unit including rotation circuitry or other logic, or the like. The execution unit and/or the apparatus may include specific or particular logic (e.g., circuitry or other hardware potentially combined with software and/or firmware) operable to execute and/or process the packed rotate instruction, and store the result in response to the instruction (e.g., in response to one or more microinstructions or other control signals derived from the instruction).

To avoid obscuring the description, a relatively simple instruction processing apparatus 200 has been shown and described. In other embodiments, the instruction processing apparatus may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. An execution unit operable to execute an embodiment of an instruction disclosed herein may be included in at least one, at least two, most, or all of the cores, logical processors, or execution engines. There are literally numerous different combinations and configurations of components in processors, and embodiments are not limited to any particular combination or configuration.

Figure 3:
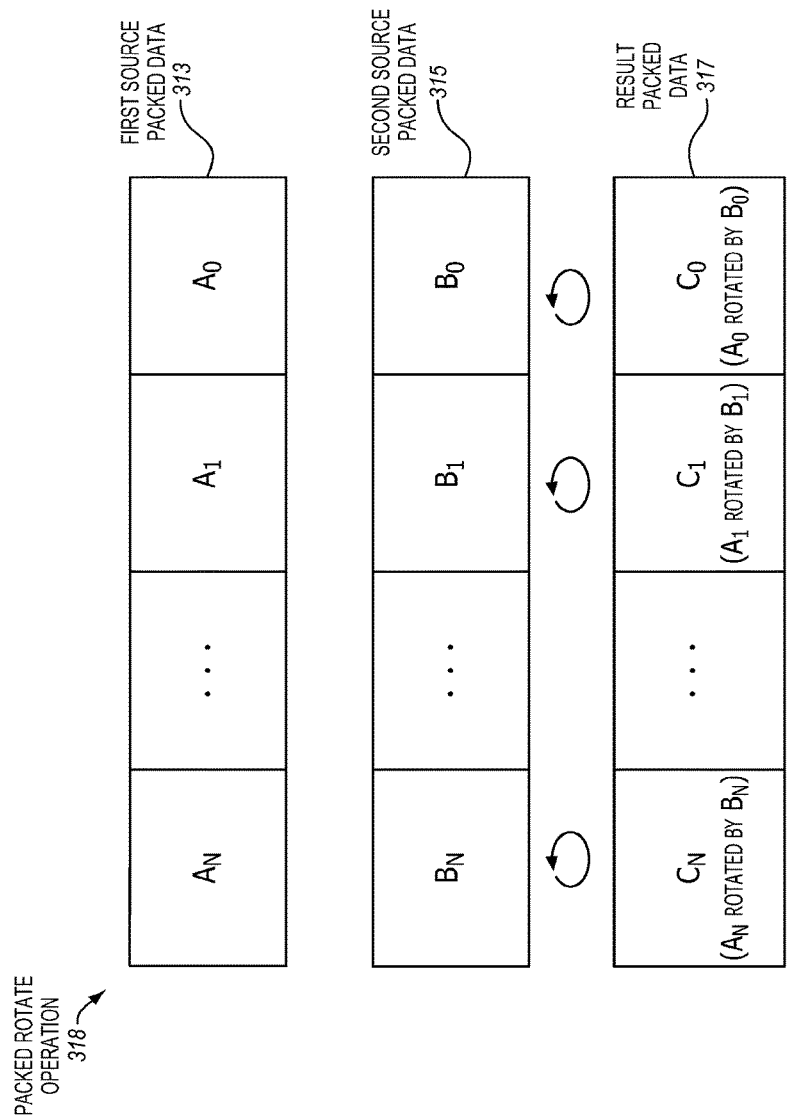
FIG. 3 is a block diagram illustrating an embodiment of a packed rotate operation that may be performed in response to an embodiment of a packed rotate instruction.

FIG. 3 is a block diagram illustrating an embodiment of a packed rotate operation 318 that may be performed in response to an embodiment of a packed rotate instruction. The instruction specifies or otherwise indicates a first source packed data 313 including a first plurality of packed data elements $A_0$-$A_N$, and specifies or otherwise indicates a second source packed data 315 including a second plurality of packed data elements $B_0$-$B_N$, where N is an integer of two or more. Commonly, N may be equal to the size in bits of the source packed data divided by the size in bits of the packed data elements. In various embodiments, the width of the source packed data may be 64-bits, 128-bits, 256-bits, 512-bits, although the scope of the invention is not limited to just these widths. In various embodiments, the width of the packed data elements may be 8-bit bytes, 16-bit words, 32-bit doublewords, or 64-bit quadwords, although the scope of the invention is not limited to just these widths. In various embodiments, N may be 2, 4, 8, 16, 32, or 64, although the scope of the invention is not limited to just these numbers of data elements. In some embodiments, the data elements in the first and second source packed data may be integers.

A result packed data 317 is generated and stored in a destination storage location in response to the packed rotate instruction. The destination storage location may be specified or otherwise indicated by the packed rotate instruction. The result packed data includes a plurality of result rotated packed data elements $C_0$-$C_N$. Each of the result rotated data elements $C_0$-$C_N$ represents a corresponding one of the packed data elements $A_0$-$A_N$ of the first source packed data 313 rotated by a corresponding one of the packed data elements $B_0$-$B_N$ of the second source packed data 315. The packed data elements $B_0$-$B_N$ of the second source packed data 315 represent rotation amounts and the packed data elements $A_0$-$A_N$ of the first source packed data 313 represent data elements to be rotated. The corresponding data elements represent data elements in corresponding positions within the packed data. By way of example, $C_0$ represents $A_0$ rotated by $B_0$, $C_1$ represents $A_1$ rotated by $B_1$, $C_N$ represents $A_N$ rotated by $B_N$, and so on. By rotated it is meant that the bits within the data elements are rotated.

By way of example, assuming a sixteen bit data element 1111111100000000 that is to be rotated, a rotation direction that is to the left, and a rotation amount of three bits, the corresponding rotated data element may be 1111100000000111. Notice that the three leftmost 1's which are rotated out of the left wrap around and rotate into right with all of the other bits shifting by three bit positions to the left. In some embodiments, if the rotation amount is greater than one less the size of the data elements (e.g., greater than 31 for doublewords or 63 for quadwords) then the rotation amount modulo the data size (e.g., 32-bits for doubleword or 64-bits for quadword) may be used, and this may optionally apply to other rotate operations disclosed herein. For clarity, in the illustration, the arrow in the rotation symbol suggests rotation to the left, although it is to be understood that, in this illustration as well as other illustrations, unless specifically stated otherwise, in all embodiments data elements may be either rotated to the left or to the right and/or either in the direction of their more significant bits (commonly on the left) or in the direction of their less significant bits (commonly on the right). Advantageously, the ability to rotate each of the data elements of the first source packed data by the rotation amounts specified by the corresponding data elements of the second source packed data allows for potentially N different rotation amounts to be applied. Alternatively, as will be explained further below, in other embodiments a single rotation amount may be used, and may be specified, for example, in an immediate of the instruction, or as another example in a single data element that is broadcasted.

Some embodiments pertain to masked packed rotate instructions and/or masked packed rotate operations. The masked packed rotate instructions may specify or otherwise indicate packed data operation masks. The packed data operation masks may also be referred to herein simply as masks. Each mask may represent a predicate operand or conditional control operand that may mask, predicate, or conditionally control whether or not packed rotate operations associated with the instruction are to be performed on source data elements and/or whether or not results of the packed rotate operations are to be stored in a packed data result. In some embodiments, each mask may be operable to mask the packed rotate operations at per-result data element granularity. Each mask may allow the packed rotate operations for different result data elements to be predicated or conditionally controlled separately and/or independently of the other result data elements. Masking may offer certain advantages, such as, for example, the ability to selectively perform operations on data elements in packed data when the operations need to be performed, but not when they do not.

The masks may each include multiple mask elements, predicate elements, conditional control elements, or flags. In one aspect, the elements or flags may be included in a one-to-one correspondence with result data elements (e.g., if there are four result data elements there may be four elements or flags). Each element or flag may be operable to mask a separate packed data operation and/or mask storage of a separate packed rotate result in a corresponding result data element. Commonly each element or flag may be a single bit. The single bit may allow specifying either of two different possibilities (e.g., perform the operation versus do not perform the operation, store a result of the operation versus do not store a result of the operation, etc.). A binary value of each bit of the mask may predicate or control whether or not a packed rotate operation is to be performed and/or whether or not a rotated result is to be stored. According to one possible convention, each bit may be set (i.e., have a binary value of 1) to allow, or cleared (i.e., have a binary value of 0) to not allow, a result of a packed rotate operation to be stored in a corresponding result data element.

In some embodiments, merging-masking may be performed. In merging-masking, when an operation is masked out for a given result data element, a value of a corresponding data element from a source packed data may be stored in the corresponding given result data element. For example, if a source storage location is to be reused as the destination storage location, then the corresponding destination data element may retain the initial source value (i.e., not be updated with a result of the operation of the instruction). In other embodiments, zeroing-masking may be performed. In zeroing-masking, when an operation is masked out for a given result data element, the corresponding given result data element may be zeroed out or a value of zero may be stored in the corresponding given result data element. Alternatively, other predetermined values may be stored in the masked out result data elements.

In some embodiments, the packed rotate operation may optionally be performed on all corresponding data elements of the source packed data having the data elements to be rotated regardless of the corresponding bits of the mask, but the rotated results may or may not be stored in the result packed data depending upon the corresponding bits of the mask. Alternatively, in another embodiment, the packed rotate operations may optionally be omitted (i.e., not performed) if the corresponding bits of the mask specify that the results of the operations are not to be stored in the packed data result. In some embodiments, exceptions and/or violations may optionally be suppressed for, or not raised by, an operation on a masked-off element. In some embodiments, for masked packed rotate instructions with a memory operand, memory faults may optionally be suppressed for masked-off data elements.

Figure 4:
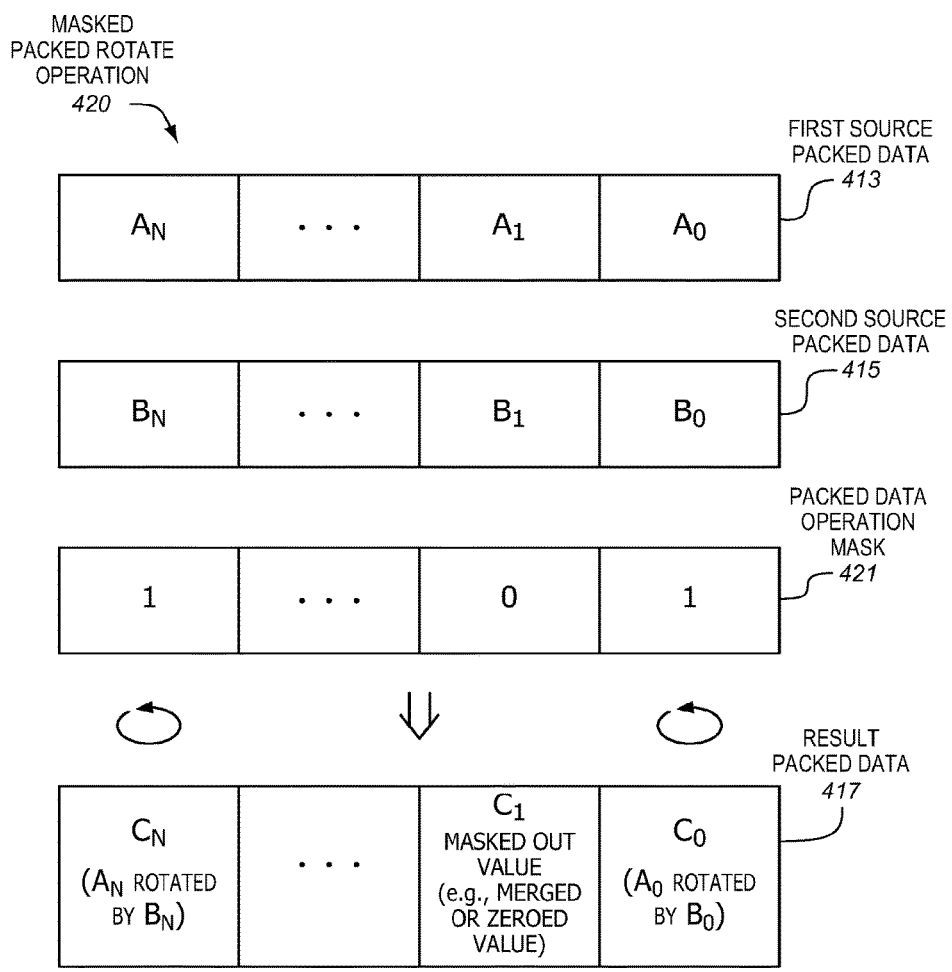
FIG. 4 is a block diagram illustrating an embodiment of a masked packed rotate operation that may be performed in response to an embodiment of a masked packed rotate instruction.

FIG. 4 is a block diagram illustrating an embodiment of a masked packed rotate operation 420 that may be performed in response to an embodiment of a masked packed rotate instruction. The instruction specifies or otherwise indicates a first source packed data 413 including a first plurality of packed data elements $A_0$-$A_N$, and specifies or otherwise indicates a second source packed data 415 including a second plurality of packed data elements $B_0$-$B_N$, where N is an integer of two or more. Commonly, N may be equal to the size in bits of the source packed data divided by the size in bits of the packed data elements. In various embodiments, the width of the source packed data may be 64-bits, 128-bits, 256-bits, 512-bits, although the scope of the invention is not limited to just these widths. In various embodiments, the width of the packed data elements may be 8-bit bytes, 16-bit words, 32-bit doublewords, or 64-bit quadwords, although the scope of the invention is not limited to just these widths. In various embodiments, N may be 2, 4, 8, 16, 32, or 64, although the scope of the invention is not limited to just these numbers of data elements. In some embodiments, the data elements in the first and second source packed data may be integers. These attributes may also apply to the other packed data and data elements in the other operations disclosed herein.

The masked packed rotate instruction also specifies or otherwise indicates a packed data operation mask 421. The packed data operation mask may include a single bit for each corresponding data element in the first source packed data and/or for each pair of corresponding data elements in the first and second source packed data. That is, there may be N-bits used for masking in the packed data operation mask. The rightmost bit corresponds to $A_0$ and/or the $A_0$ and $B_0$ pair, the leftmost bit corresponds to $A_N$ and/or the $A_N$ and $B_N$ pair, and so on. By way of example, in the case of 512-bit wide packed data and 32-bit doubleword data elements, the packed data operation mask may include sixteen 1-bit mask bits, or in the case of 64-bit quadword data elements the mask may include eight 1-bit mask bits.

A result packed data 417 is generated and stored in a destination storage location in response to the packed rotate instruction. The destination storage location may be specified or otherwise indicated by the packed rotate instruction. As mentioned above, in the masked packed rotate operation, the packed data operation mask 421 is used to predicate or conditionally control whether or not rotated results are stored in the result packed data. In the illustrated embodiment, the mask bits follow one of two possible conventions, in which binary 1 indicates that a rotated result is to be stored in the result packed data, and in which binary 0 indicates that a rotated result is not to be stored in the result packed data. The other convention is also possible in an alternate embodiment. The result packed data includes a plurality of result packed data elements. Each of the result data elements that are not masked out (i.e., there is not a zero in the corresponding bit of the packed data operation mask) represents a corresponding one of the packed data elements $A_0$-$A_N$ of the first source packed data 413 rotated by a corresponding one of the packed data elements $B_0$-$B_N$ of the second source packed data 415. In the example given in the illustration, this is the case for result data elements $C_0$ and $C_N$. In particular $C_0$ includes $A_0$ rotated by $B_0$, and $C_N$ includes $A_N$ rotated by $B_N$. The rotation direction may be either to the right or to the left. In some embodiments, if the rotation amount is greater than one less the size of the data elements (e.g., greater than 31 for doublewords or 63 for quadwords) then the rotation amount modulo the data size (e.g., 32-bits for doubleword or 64-bits for quadword) may be used. However, a masked out value, such as, for example, a merged or zeroed value, is included in data element $C_1$. Similarly, such a masked out value may be stored in the result packed data for each bit in the packed data operation mask that is binary 0.

In the embodiment of FIG. 4, the second source packed data provides a plurality of potentially different rotation amounts. In an alternate embodiment, otherwise similar to that shown in FIG. 4, an immediate of the instruction may provide a single rotation amount that is to be applied, conditioned upon the masking, to each of the data elements in the first source packed data.

Figure 5:
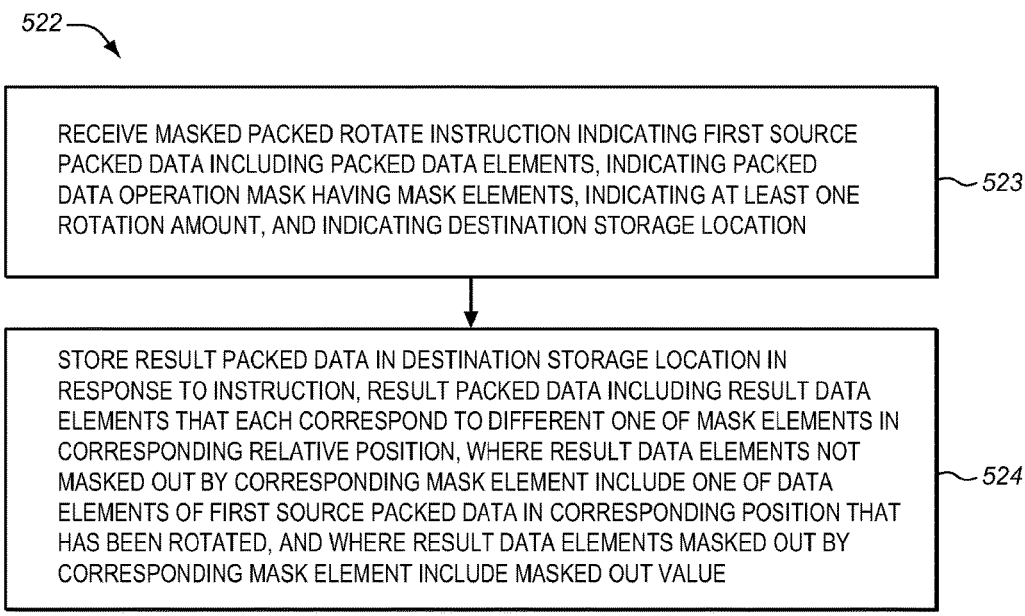
FIG. 5 is a block flow diagram of an embodiment of a method of processing an embodiment of a masked packed rotate instruction.

FIG. 5 is a block flow diagram of an embodiment of a method 522 of processing an embodiment of a masked packed rotate instruction. In various embodiments, the method may be performed by a general-purpose processor, a special-purpose processor (e.g., a graphics processor or a digital signal processor), or another type of digital logic device or instruction processing apparatus. In some embodiments, the method 522 may be performed by the processor 100 of FIG. 1, or the instruction processing apparatus 200 of FIG. 2, or a similar processor or instruction processing apparatus. Alternatively, the method 522 may be performed by different embodiments of processors or instruction processing apparatus. Moreover, the processor 100, and the instruction processing apparatus 200, may perform embodiments of operations and methods the same as, similar to, or different than those of the method 522.

The method includes receiving a masked packed rotate instruction, at block 523. In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache). The masked packed rotate instruction may specify or otherwise indicate a first source packed data including a plurality of packed data elements. The instruction may also specify or otherwise indicate a packed data operation mask having a plurality of mask elements. The instruction may also specify or otherwise indicate at least one rotation amount. The instruction may also specify or otherwise indicate a destination storage location where a result packed data is to be stored.

A result packed data may be stored in the indicated destination storage location in response to, as a result of, and/or as specified by the masked packed rotate instruction, at block 524. The result packed data includes a plurality of result data elements that each correspond to a different one of the mask elements in a corresponding relative position. Result data elements that are not masked out by the corresponding mask element include one of the data elements of the first source packed data in a corresponding position that has been rotated. Result data elements that are masked out by the corresponding mask element include a masked out value.

The illustrated method includes operations that are visible from outside a processor or instruction processing apparatus (e.g., visible from a software perspective). In other embodiments, the method may optionally include one or more operations occurring internally within the processor. By way of example, the instructions may be fetched and then decoded, translated, emulated, or otherwise converted into one or more other instructions or control signals. The source operands may be accessed and/or received. An execution unit may be enabled to perform the operation specified by the instruction, and may perform the operation (e.g., microarchitectural operations to implement the operations of the instructions such as rotation operations may be performed). Different microarchitectural ways of performing the operation are contemplated.

Figure 6:
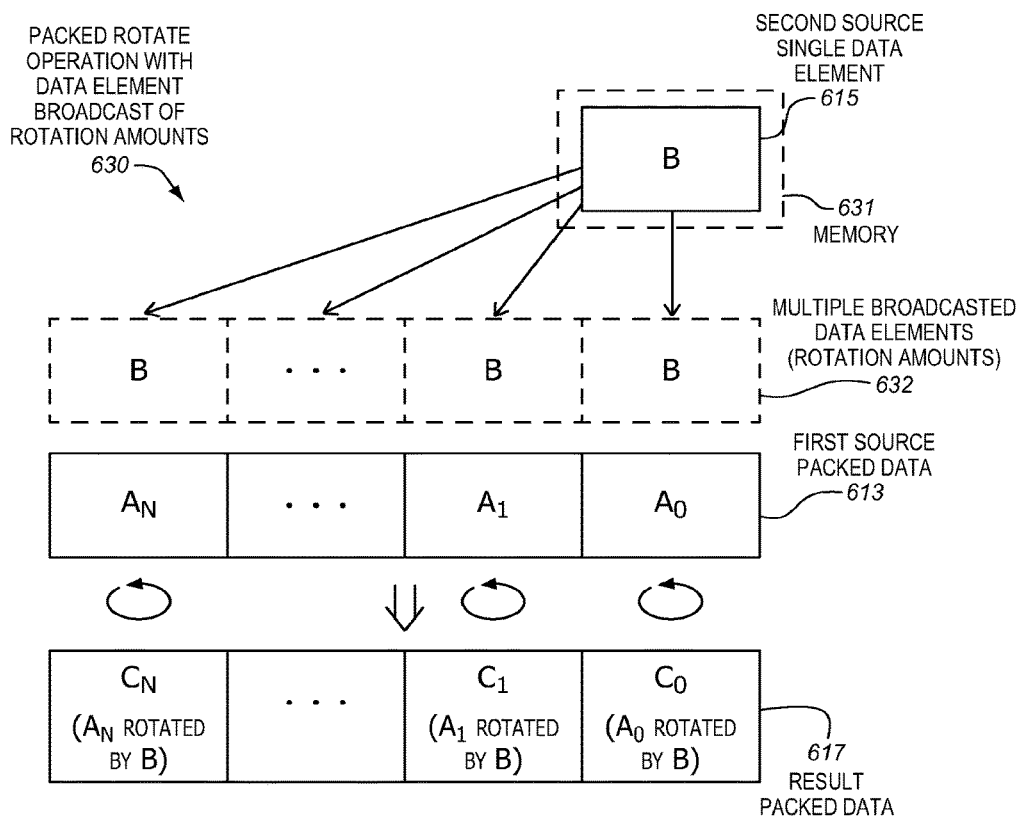
FIG. 6 is a block diagram illustrating an embodiment of a packed rotate operation with data element broadcast of rotation amounts.

FIG. 6 is a block diagram illustrating an embodiment of a packed rotate operation with data element broadcast of rotation amounts 630 that may be performed in response to an embodiment of a packed rotate instruction with data element broadcast of rotation amounts. Data element broadcast is useful where it is desirable to reuse a single source data element for each of multiple packed data operations. The instruction may indicate a first source packed data 613 having a plurality of packed data elements $A_0$-$A_N$. The instruction may also indicate a second source single data element B 615, which is to be broadcast. In some embodiments, the single data element B 615 may be stored in memory 631 (e.g., main memory), although this is not required. The instruction may also indicate a destination storage location.

The packed rotate instruction with data element broadcast of rotation amounts may combine an initial data element broadcast of the single data element B 615 of the second source with a subsequent packed rotate operation. In this case, the single data element B is a fixed rotation amount that is to be applied to each of the data elements $A_0$-$A_N$. The initial data element broadcast may broadcast or replicate the single data element B multiple times (e.g., a number of times equal to the number N of data elements $A_0$-$A_N$ of the first source packed data). As mentioned previously, N may be 2, 4, 8, 16, 32, or 64, although the scope of the invention is not limited to just these numbers of data elements.

The multiple broadcasted (e.g., replicated) data elements 632, in this case representing rotation amounts, may represent a packed data or vector that is to be used in the subsequent packed rotate operation along with the plurality of data elements $A_0$-$A_N$ in the first source packed data. In some embodiments, the single source data element B may reside in memory 631 (e.g., main memory) and the data element broadcast may be implemented through a load operation (e.g., a load micro-op) derived from the packed rotate instruction with data element broadcast. The broadcast of the single data element may represent a pre-processing data transformation prior to performing the packed rotate operation. In one aspect, the multiple broadcasted data elements 632 may be stored, for example in a microarchitectural temporary register. Alternatively, in another aspect, the multiple broadcasted data elements 632 may not necessarily be stored even temporarily but may merely be conveyed through circuitry.

A result packed data 617 is generated and stored in the destination storage location in response to the packed rotate instruction with data element broadcast of rotation amounts. The result packed data includes a plurality of result rotated packed data elements $C_0$-$C_N$. Each of the result rotated data elements $C_0$-$C_N$ represents a corresponding one of the packed data elements $A_0$-$A_N$ of the first source packed data 616 rotated by a rotation amount specified by a different corresponding one of the multiple broadcasted data elements 632 each representing a different replication or copy of the single data element B 615. That is, $C_0$ represents $A_0$ rotated by B, $C_1$ represents $A_1$ rotated by B, $C_N$ represents $A_N$ rotated by B, and so on. Notice that the single rotation amount is used for each of $A_0$-$A_N$. The rotation may either be to the right or to the left. Advantageously, the broadcast allows a rotation amount specified by the single data element B 615 to be applied to each of the data elements $A_0$-$A_N$ in a single rotate instruction.

Figure 7:
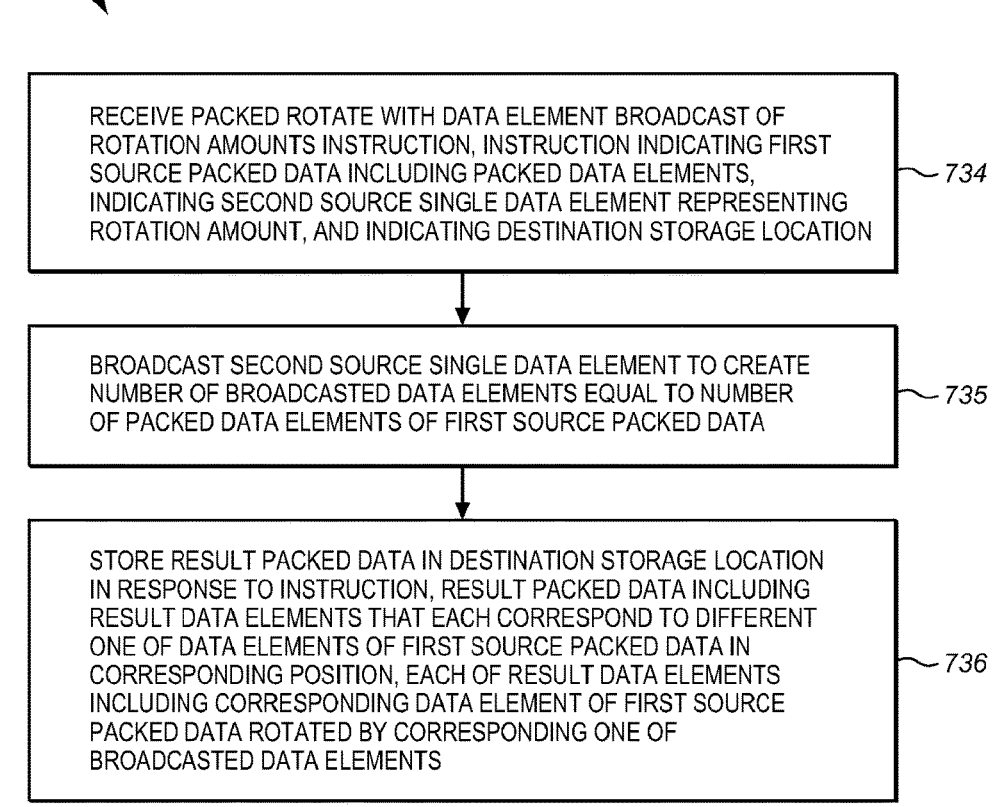
FIG. 7 is a block flow diagram of an embodiment of a method of processing an embodiment of a packed rotate with data element broadcast of rotation amounts instruction.

FIG. 7 is a block flow diagram of an embodiment of a method 733 of processing an embodiment of a packed rotate with data element broadcast of rotation amounts instruction. In various embodiments, the method may be performed by a general-purpose processor, a special-purpose processor (e.g., a graphics processor or a digital signal processor), or another type of digital logic device or instruction processing apparatus. In some embodiments, the method 733 may be performed by the processor 100 of FIG. 1, or the instruction processing apparatus 200 of FIG. 2, or a similar processor or instruction processing apparatus. Alternatively, the method 733 may be performed by different embodiments of processors or instruction processing apparatus. Moreover, the processor 100, and the instruction processing apparatus 200, may perform embodiments of operations and methods the same as, similar to, or different than those of the method 733.

The method includes receiving the packed rotate instruction with data element broadcast of rotation amounts instruction, at block 734. In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache). The instruction specifies or otherwise indicates a first source packed data including a plurality of packed data elements. The instruction specifies or otherwise indicates a second source single data element representing a rotation amount. The instruction also specifies or otherwise indicates a destination storage location.

The second source single data element is broadcasted to create a number of broadcasted data elements, at block 735. The plurality of broadcasted data elements is the same as the number of packed data elements in the first source packed data. Each of the broadcasted data elements represents a replica or copy of the single data element of the second source and specifies the same rotation amount.

A result packed data is stored in the destination storage location in response to, as a result of, and/or as specified by the packed rotate instruction with data element broadcast of rotation amounts instruction, at block 736. The result packed data includes a plurality of result rotated packed data elements that each correspond to a different one of the data elements of the first source packed data in a corresponding position. Each of the result data elements represents or includes the corresponding data element of the first source packed data that has been rotated by a corresponding one of the broadcasted data elements (e.g., by a rotation amount specified by the broadcasted data elements). The broadcasted data elements each represent or include a different replication or copy of the single second source data element. The rotation may either be to the right or to the left.

Figure 8:
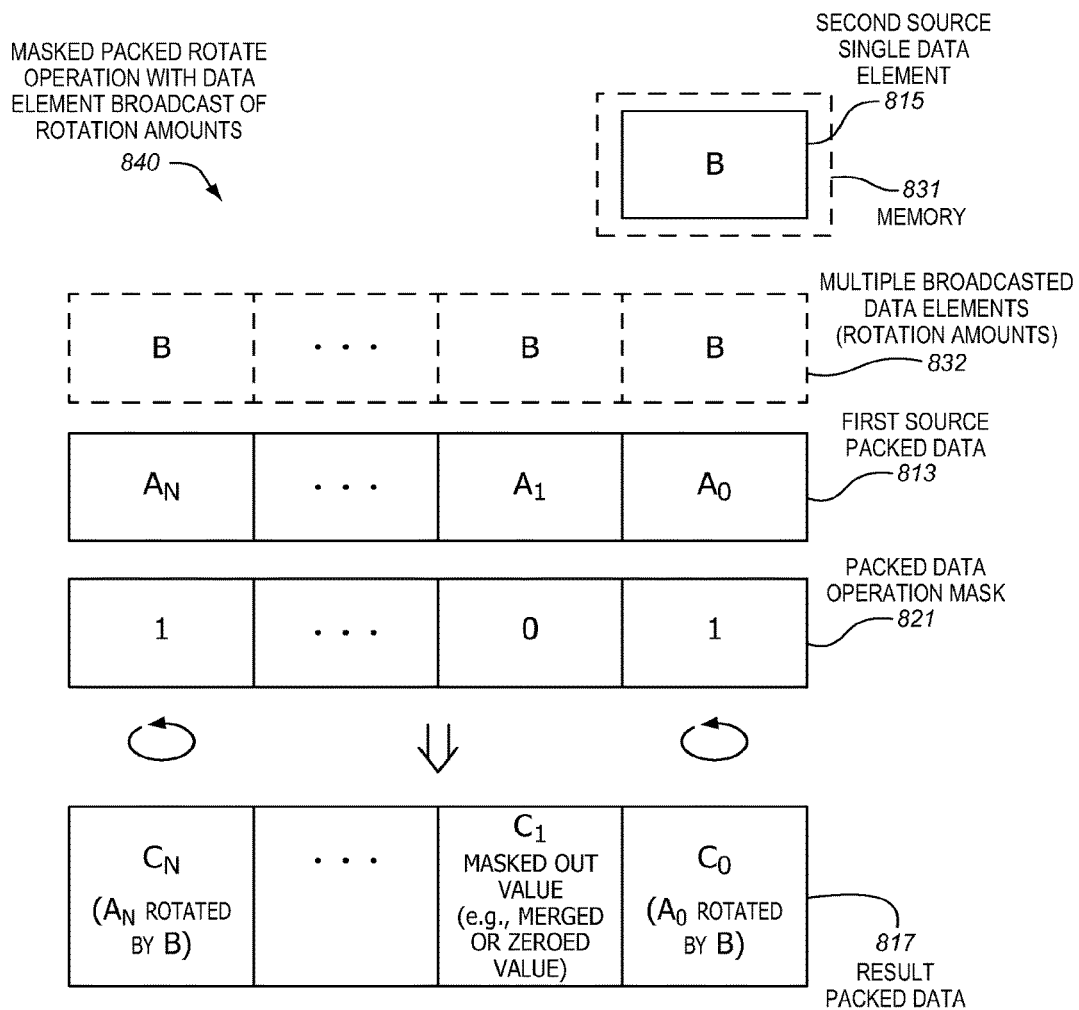
FIG. 8 is a block diagram illustrating an embodiment of a masked packed rotate operation with data element broadcast of rotation amounts.

FIG. 8 is a block diagram illustrating an embodiment of a masked packed rotate operation with data element broadcast of rotation amounts 840 that may be performed in response to an embodiment of a masked packed rotate instruction with data element broadcast of rotation amounts. With the exception of the addition of masking to the operation 840, the operation 840 may be similar to the previously described operation 630 of FIG. 6. To avoid obscuring the description, the discussion below will emphasize the different or additional features of the operation 840, without repeating all of the similarities. It is to be understood that except where expressed otherwise, or otherwise readily apparent, that attributes and variations described for the operation 630 also apply to the operation 840.

The masked packed rotate instruction with data element broadcast of rotation amounts may indicate a first source packed data 813 having a plurality of packed data elements $A_0$-$A_N$. The instruction may also indicate a second source single data element B 815, which is to be broadcast. In some embodiments, the single data element B 815 may be stored in memory 831 (e.g., main memory), although this is not required. The instruction may also indicate a packed data operation mask 821 having a plurality of bits equal in number to the number of packed data elements $A_0$-$A_N$. The instruction may also indicate a destination storage location.

The second source single data element 815 may be broadcast into multiple broadcasted data elements 832. In this case, the single data element B is a fixed rotation amount that is to be applied to each of the data elements $A_0$-$A_N$. The data element broadcast may broadcast or replicate the single data element B multiple times (e.g., equal to the number N of data elements $A_0$-$A_N$). As mentioned previously, N may be 2, 4, 8, 16, 32, or 64, for example.

A result packed data 817 is generated and stored in the destination storage location in response to the instruction. The packed data operation mask 821 is used to predicate or conditionally control whether or not rotated results are stored in the result packed data. In the illustrated embodiment, the mask bits follow one of two possible conventions, in which binary 1 indicates that a rotated result is to be stored in the result packed data, and in which binary 0 indicates that a rotated result is not to be stored in the result packed data.

The other convention is also possible in an alternate embodiment. Each of the result data elements that are not masked out (i.e., there is not a zero in the corresponding bit of the packed data operation mask) represents a corresponding one of the packed data elements $A_0$-$A_N$ of the first source packed data 813 rotated by a rotation amount specified by a different corresponding one of the multiple broadcasted data elements 632, which each represents a different replica or copy of the single data element B 815. In the example given in the illustration, this is the case for result data elements $C_0$ and $C_N$. In particular $C_0$ includes $A_0$ rotated by a first replica of B, and $C_N$ includes $A_N$ rotated by an Nth replica of B. The rotation direction may be either to the right or to the left. However, a masked out value, such as, for example, a merged or zeroed value, is included in data element $C_1$. Similarly, such a masked out value may be stored in the result packed data for each bit in the packed data operation mask that is binary 0.

Figure 9:
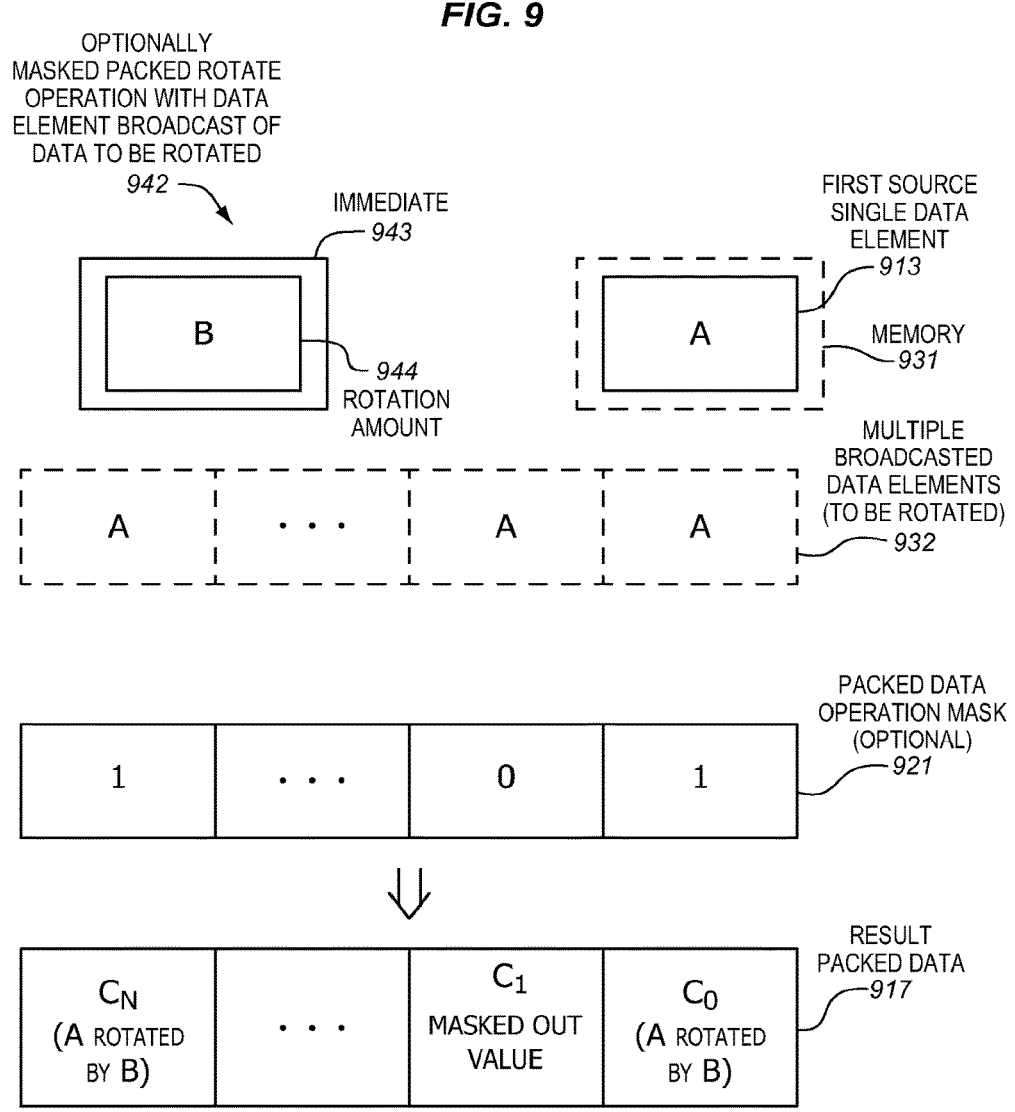
FIG. 9 is a block diagram illustrating an embodiment of an optionally masked packed rotate operation with data element broadcast of a data element to be rotated and a rotation amount specified by an immediate.

FIG. 9 is a block diagram illustrating an embodiment of an optionally masked packed rotate operation 942 with data element broadcast of a data element to be rotated 913 and a rotation amount specified by an immediate 943. The operation may be performed in response to an embodiment of an optionally masked packed rotate instruction with data element broadcast of a data element to be rotated.

The instruction may indicate a first source single data element A 913. In some embodiments, the single data element A 913 may be stored in memory 931 (e.g., main memory), although this is not required. The instruction may also have an immediate 943 that specifies a rotation amount B 944. The instruction may also optionally in some embodiments specify a packed data operation mask 921 having a plurality of bits equal in number to the number broadcasted data elements. The instruction may also indicate a destination storage location. The first source single data element 913 is broadcasted into multiple broadcasted data elements 932, which are to be rotated.

A result packed data 917 is generated and stored in the destination storage location in response to the instruction. As before, the optional packed data operation mask 921 is used to predicate or conditionally control whether or not rotated results are stored in the result packed data. Each of the result data elements that are not masked out represents a corresponding one of the replicated broadcast data elements A 932 rotated by the rotation amount B 944 specified by the immediate 943. In the example given in the illustration, $C_0$ includes a first replica of A rotated by B, and $C_N$ includes an Nth replica of A rotated by B. The rotation direction may be either to the right or to the left. However, a masked out value, such as, for example, a merged or zeroed value, is included in data element C1. Similarly, such a masked out value may be stored in the result packed data for each bit in the packed data operation mask that is binary 0. In several of the figures, $C_1$ has been used to contain a masked out value, although this is only for convenience of illustration. $C_1$ may instead include rotated results.

FIG. 10 is a block diagram of an embodiment of an instruction format for a masked packed rotate with data element broadcast instruction 1006. The instruction format includes an operation code or opcode 1045. The opcode may represent a plurality of bits or one or more fields that are operable to identify the instruction and/or the operation to be performed.

The instruction format includes a first source specifier 1046 to explicitly specify a first source operand or storage location, an optional second source specifier 1047 to explicitly specify a second source operand or storage location, and a destination specifier 1048 to explicitly specify a destination operand or storage location where a result is to be stored. By way of example, each of these specifiers may include an address of a register, memory location, or other storage location. Alternatively, as previously mentioned, one or more of the first source, the second source, or the destination may be implicit to the instruction, as opposed to being explicitly specified. For example, one of the sources may optionally be reused as the destination and the initial contents may be overwritten with the result. That is, the destination may be implicitly indicated as one of the sources. In some embodiments, there is no second source and accordingly the second source is not needed (e.g., in the case of an immediate specifying a rotation amount).

In some embodiments in which the instruction is a packed rotate instruction with data element broadcast, the instruction format may include an optional data element broadcast control 1049. The data element broadcast control may include one or more bits or fields to indicate that data element broadcast is to be performed. As previously discussed, the data element broadcast may involve broadcasting a single source data element, accessed from a specified or indicated storage location (e.g., memory), into a plurality of replicated data elements that are to be used by the instruction.

In some embodiments in which the instruction is a masked packed rotate instruction, the instruction format may include an optional packed data operation mask specifier 1050. The mask specifier may explicitly specify a packed data operation mask operand or storage location (e.g., a packed data operation mask register). Alternatively, the packed data operation mask may be implicitly indicated. In some embodiments, the instruction format may also include an optional type of masking operation specifier 1051 to specify a type of masking operation. By way of example, the type of masking operation specifier may include a single bit to specify whether merging-masking or zeroing-masking is to be performed. Two or more bits may be used if additional types of masking are utilized. Alternatively, the type of masking operation may be implicitly indicated (e.g., in an implicit control register). As mentioned above, masking is optional and not required.

The illustrated instruction format shows examples of the types of fields that may be included in an embodiment of a packed rotate instruction. As shown, some embodiments may combine broadcasting with masking. Alternate embodiments may include a subset of the illustrated fields or may add additional fields. For example, some instructions use masking without broadcasting, or broadcasting without masking. As another example, in instructions specify a rotation amount through an immediate and may omit one of the source specifiers. The illustrated order/arrangement of the fields is not required, but rather the fields may be rearranged. Fields need not include contiguous sequences of bits but rather may be composed of non-contiguous or separated bits. In some embodiments, the instruction format may follow an EVEX encoding or instruction format, although this is not required. Further details of the EVEX encoding are discussed further below.

Figure 11:
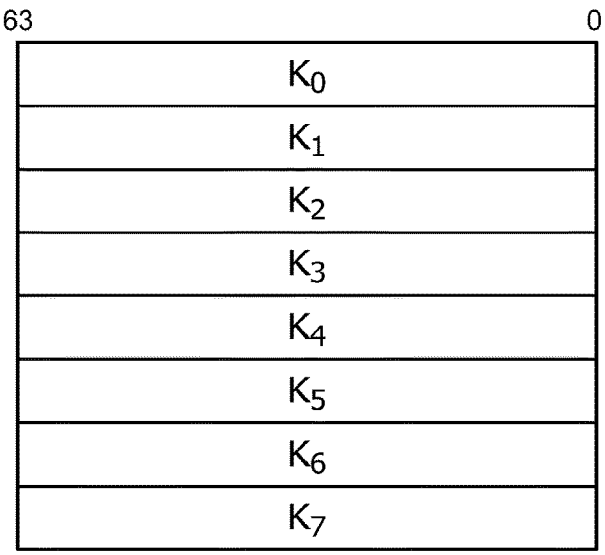
FIG. 11 is a block diagram of an example embodiment of a suitable set of packed data operation mask registers.

FIG. 11 is a block diagram of an example embodiment of a suitable set of packed data operation mask registers 1109. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). The packed data operation mask registers may be implemented in different ways using well known techniques and are not limited to any known particular type of circuit. Various different types of registers are suitable as long as they are capable of storing and providing data as described herein. Examples of suitable registers include, but are not limited to, dedicated physical registers, dynamically allocated physical registers using register renaming, and combinations thereof.

In some embodiments, the packed data operation mask registers 1109 may be a separate, dedicated set of architectural registers. In some embodiments, the instructions may encode or specify the packed data operation mask registers in different bits or one or more different field combinations of an instruction format than that used to encode or specify other types of registers (e.g., packed data registers). By way of example, the masked packed data instructions may use three bits (e.g., a 3-bit field) to encode or specify any one of the eight packed data operation mask registers k0 through k7. In alternate embodiments, either fewer or more bits may be used when there are fewer or more packed data operation mask registers, respectively. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has an all ones or "no mask" encoding). In other embodiments, either all or only some of the registers may be encoded as a predicate operand.

Figure 12:
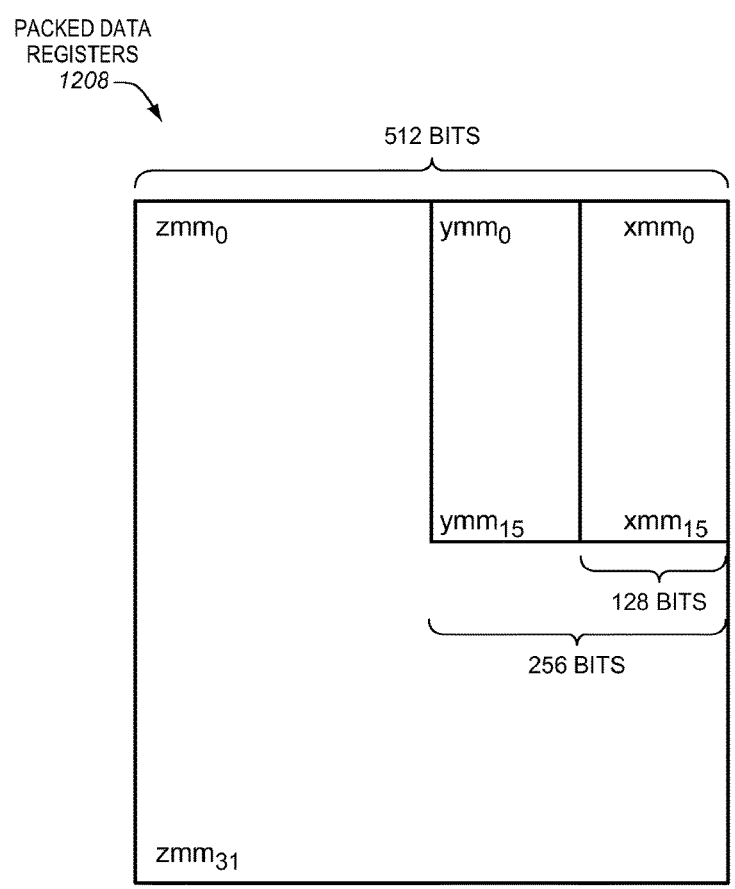
FIG. 12 is a block diagram of an example embodiment of a suitable set of packed data registers.

FIG. 12 is a block diagram of an example embodiment of a suitable set of packed data registers 1208. The illustrated packed data registers include thirty-two 512-bit packed data or vector registers. These thirty-two 512-bit registers are labeled ZMM0 through ZMM31. In the illustrated embodiment, the lower order 256-bits of the lower sixteen of these registers, namely ZMM0-ZMM15, are aliased or overlaid on respective 256-bit packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data, or 128-bit packed data. The 128-bit registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 13:
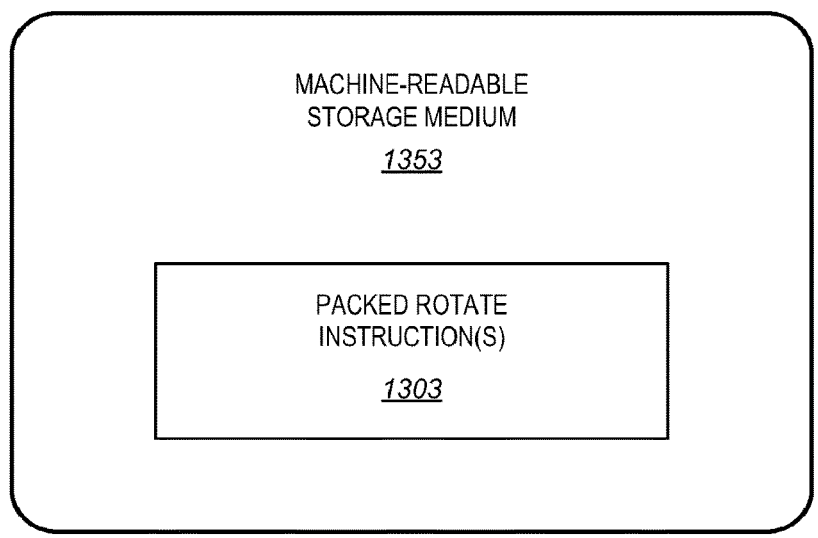
FIG. 13 is a block diagram of an article of manufacture including a machine-readable storage medium storing one or more packed rotate instructions.

FIG. 13 is a block diagram of an article of manufacture (e.g., a computer program product) 1352 including a machine-readable storage medium 1353. In some embodiments, the machine-readable storage medium may be a tangible and/or non-transitory machine-readable storage medium. In various example embodiments, the machine-readable storage medium may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid data storage materials, such as, for example, a semiconductor data storage material, a phase-change data storage material, a magnetic data storage material, an optically transparent solid data storage material, etc.

The machine-readable storage medium stores one or more packed rotate instructions 1303. Each of the packed rotate instructions, if executed by a machine, is operable to cause the machine to store a result in a destination storage location indicated by the instruction. Any of the instructions and results disclosed herein are suitable. In some embodiments, the packed rotate instruction is a masked packed rotate instruction. In some embodiments, the packed rotate instruction is a packed rotate instruction with data element broadcast. In some embodiments, the packed rotate instruction may use both masking and broadcast.

Examples of different types of machines include, but are not limited to, processors (e.g., general-purpose processors and special-purpose processors), instruction processing apparatus, and various electronic devices having one or more processors or instruction processing apparatus. A few representative examples of such electronic devices include, but are not limited to, computer systems, desktops, laptops, notebooks, servers, network routers, network switches, nettops, set-top boxes, cellular phones, video game controllers, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 14A:
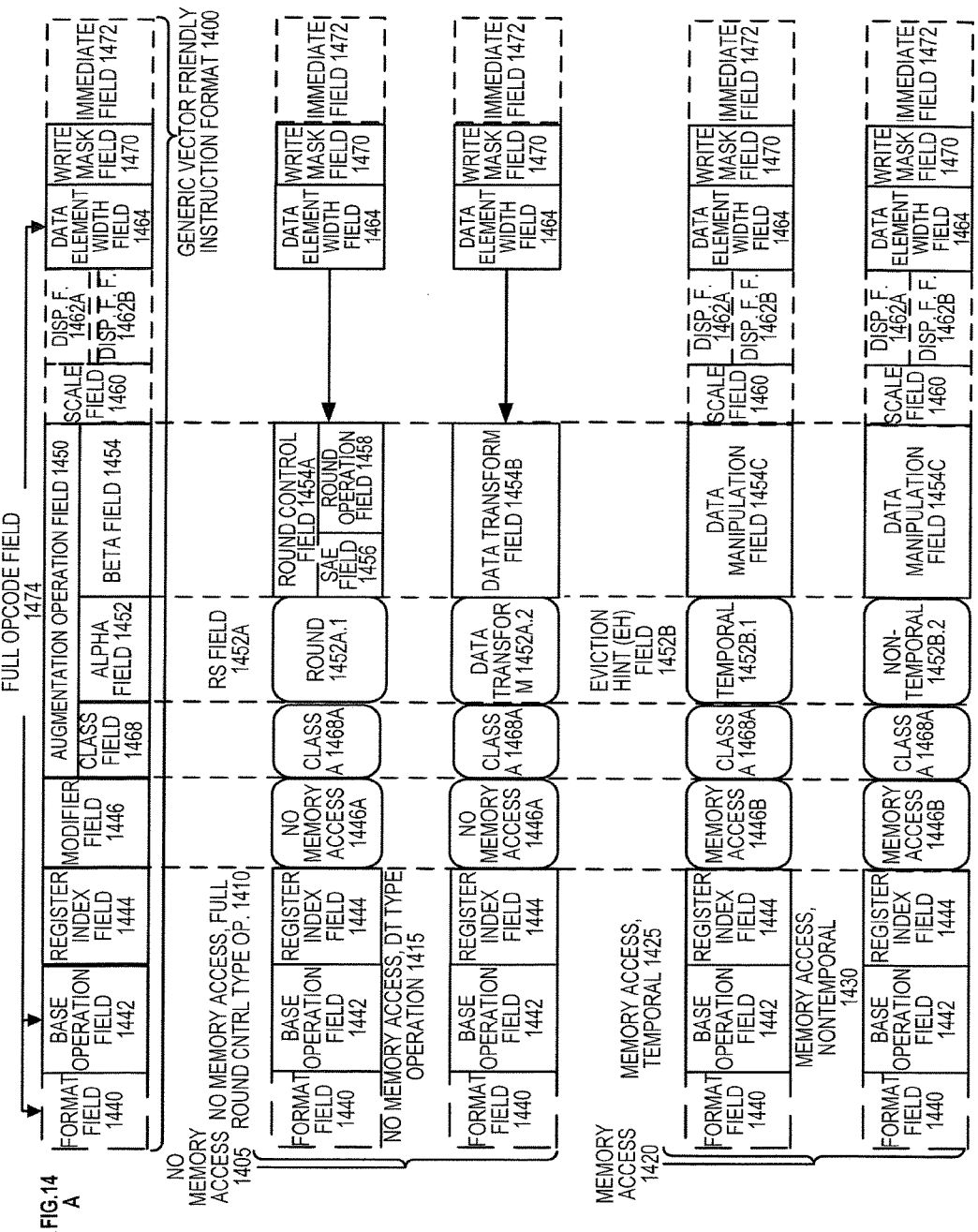
FIG. 14A is a block diagram illustrating a generic vector friendly instruction format and class A instruction templates thereof according to embodiments of the invention.
Figure 14B:
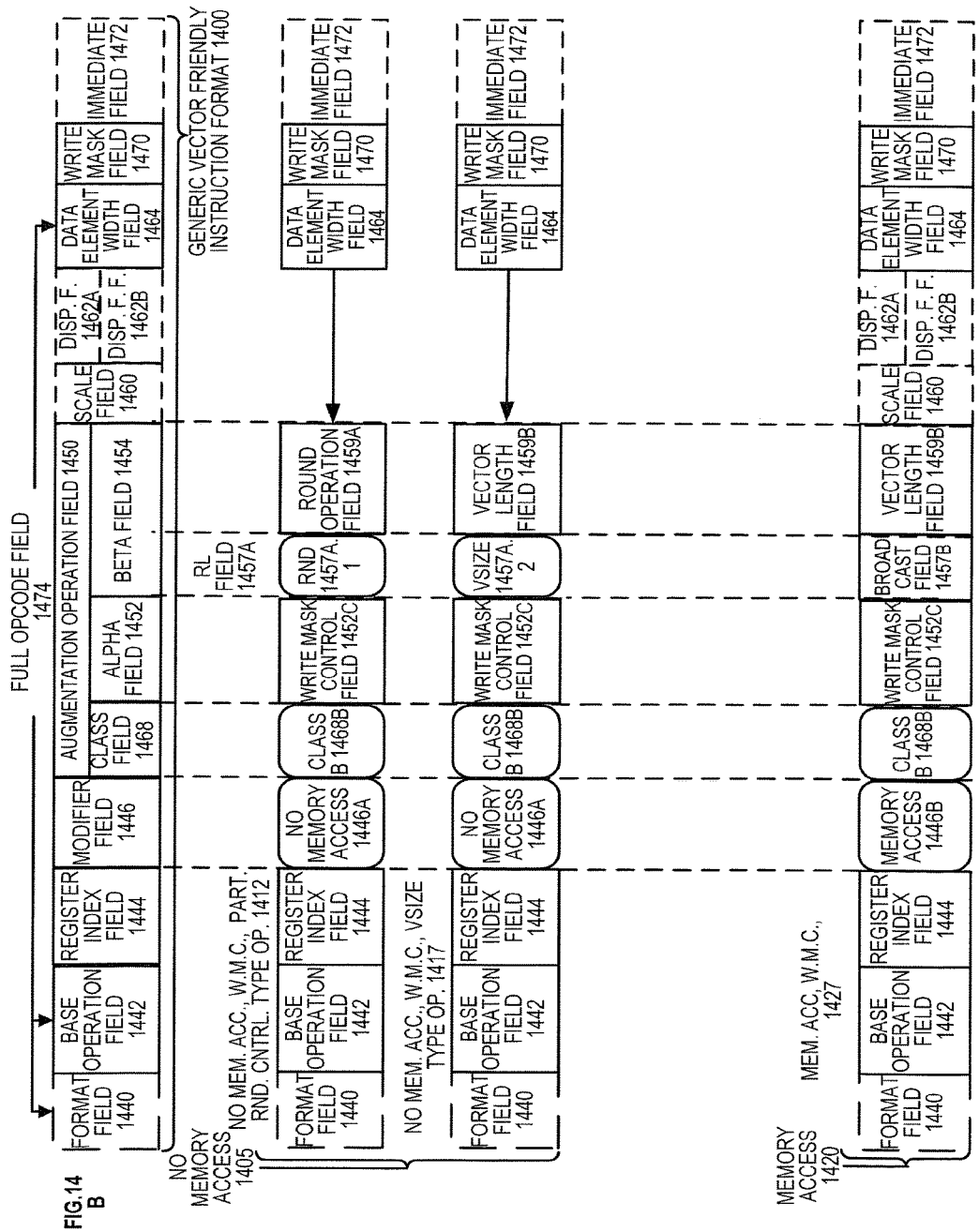
FIG. 14B is a block diagram illustrating the generic vector friendly instruction format and class B instruction templates thereof according to embodiments of the invention.

FIGS. 14A-14B are block diagrams illustrating a generic vector friendly instruction format and instruction templates thereof according to embodiments of the invention. FIG. 14A is a block diagram illustrating a generic vector friendly instruction format and class A instruction templates thereof according to embodiments of the invention; while FIG. 14B is a block diagram illustrating the generic vector friendly instruction format and class B instruction templates thereof according to embodiments of the invention. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In one embodiment of the invention, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}*$index+base).

Displacement Field 1462A—its content is used as part of memory address generation (e.g., for address generation that uses $2^{scale}*$index+base+displacement).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments of the invention are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of an immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates—Full Round Control Type Operation

In the no memory access full round control type operation 1410 instruction template, the beta field 1454 is interpreted as a round control field 1454A, whose content(s) provide static rounding. While in the described embodiments of the invention the round control field 1454A includes a suppress all floating point exceptions (SAE) field 1456 and a round operation control field 1458, alternative embodiments may support may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In one embodiment of the invention where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In one embodiment of the invention where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15A is a block diagram illustrating an exemplary specific vector friendly instruction format according to embodiments of the invention. FIG. 15A shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15A map are illustrated.

It should be understood that, although embodiments of the invention are described with reference to the specific vector friendly instruction format 1500 in the context of the generic vector friendly instruction format 1400 for illustrative purposes, the invention is not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one bit field in the specific vector friendly instruction format 1500, the invention is not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0×62 (the unique value used for distinguishing the vector friendly instruction format in one embodiment of the invention).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]—R), EVEX.X bit field (EVEX byte 1, bit [6]—X), and 1457BEX byte 1, bit[5]—B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1410—this is the first part of the REX' field 1410 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0]—mmmm)—its content encodes an implied leading opcode byte (0F, 0F 38, or 0F 3).

Data element width field 1464 (EVEX byte 2, bit [7]—W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (1 s complement) form. Depending on the instruction, an extra different EVEX bit field is used to extend the specifier size to 32 registers.

EVEX.0 1468 Class field (EVEX byte 2, bit [2]—U)—If EVEX.0=0, it indicates class A or EVEX.U0; if EVEX.0=1, it indicates class B or EVEX.U1.

Prefix encoding field 1525 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1452 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]-SSS, also known as EVEX.$s_{2-0}$, EVEX.$r_{2-0}$, EVEX.rr1, EVEX.LL0, EVEX-.LLB; also illustrated with βββ)—as previously described, this field is context specific.

REX' field 1410—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M field 1546. As previously described, the MOD field's 1542 content distinguishes between memory access and non-memory access operations. The role of Reg field 1544 can be summarized to two situations: encoding either the destination register operand or a source register operand, or be treated as an opcode extension and not used to encode any instruction operand. The role of R/M field 1546 may include the following: encoding the instruction operand that references a memory address, or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7)—when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1472 operates as previously described.

Full Opcode Field

FIG. 15B is a block diagram illustrating the fields of the specific vector friendly instruction format 1500 that make up the full opcode field 1474 according to one embodiment of the invention. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to one embodiment of the invention. Specifically, the register index field 1444 includes the REX field 1505, the REX′ field 1510, the MODR/M.reg field 1544, the MODR/M.r/m field 1546, the VVVV field 1520, xxx field 1554, and the bbb field 1556.

Augmentation Operation Field

FIG. 15D is a block diagram illustrating the fields of the specific vector friendly instruction format 1500 that make up the augmentation operation field 1450 according to one embodiment of the invention. When the class (U) field 1468 contains 0, it signifies EVEX.U0 (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]—EH) is interpreted as the rs field 1452A. When the rs field 1452A contains a 1 (round 1452A.1), the beta field 1454 (EVEX byte 3, bits [6:4]—SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]—SSS) is interpreted as a three bit data transform field 1454B. When U=0 and the MOD field 1542 contains 00, 01, or 10 (signifying a memory access operation), the alpha field 1452 (EVEX byte 3, bit [7]—EH) is interpreted as the eviction hint (EH) field 1452B and the beta field 1454 (EVEX byte 3, bits [6:4]—SSS) is interpreted as a three bit data manipulation field 1454C.

When U=1, the alpha field 1452 (EVEX byte 3, bit [7]—EH) is interpreted as the write mask control (Z) field 1452C. When U=1 and the MOD field 1542 contains 11 (signifying a no memory access operation), part of the beta field 1454 (EVEX byte 3, bit [4]—$S_0$) is interpreted as the RL field 1457A; when it contains a 1 (round 1457A.1) the rest of the beta field 1454 (EVEX byte 3, bit [6-5]—$S_{2-1}$) is interpreted as the round operation field 1459A, while when the RL field 1457A contains a 0 (VSIZE 1457.A2) the rest of the beta field 1454 (EVEX byte 3, bit [6-5]—$S_{2-1}$) is interpreted as the vector length field 1459B (EVEX byte 3, bit [6-5]—$L_{1-0}$). When U=1 and the MOD field 1542 contains 00, 01, or 10 (signifying a memory access operation), the beta field 1454 (EVEX byte 3, bits [6:4]—SSS) is interpreted as the vector length field 1459B (EVEX byte 3, bit [6-5]—$L_{1-0}$) and the broadcast field 1457B (EVEX byte 3, bit [4]—B).

Exemplary Register Architecture

Figure 16:
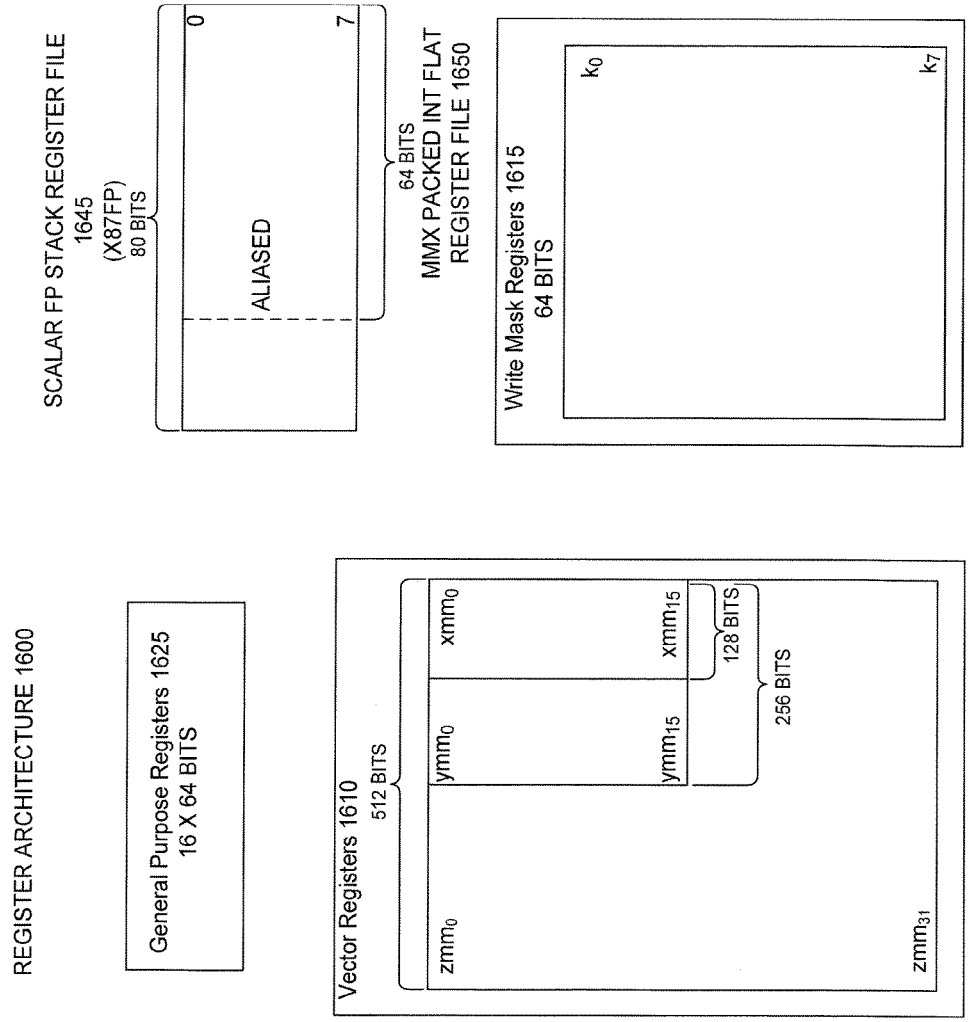
FIG. 16 is a block diagram of a register architecture according to one embodiment of the invention.

FIG. 16 is a block diagram of a register architecture 1600 according to one embodiment of the invention. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
| --- | --- | --- | --- |
| Instruction Templates that do not include the vector length field 1459B | A (FIG. 14A; U = 0) | 1410, 1415, 1425, 1430 | zmm registers (the vector length is 64 byte) |
|  | B (FIG. 14B; U = 1) | 1412 | zmm registers (the vector length is 64 byte) |
| Instruction templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 18B:
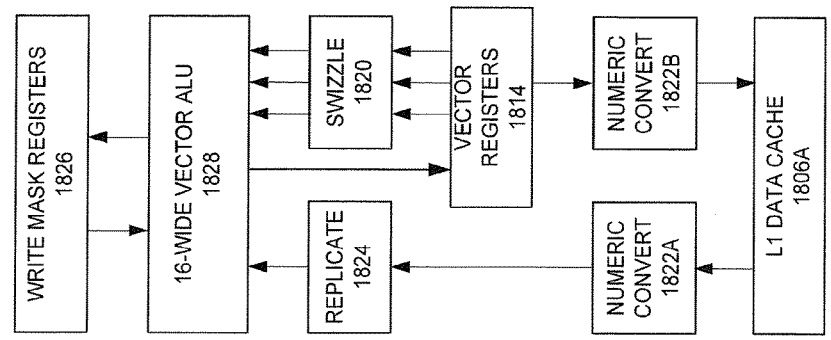
FIG. 18B is an expanded view of part of the processor core in FIG. 18A according to embodiments of the invention.
Figure 18A:
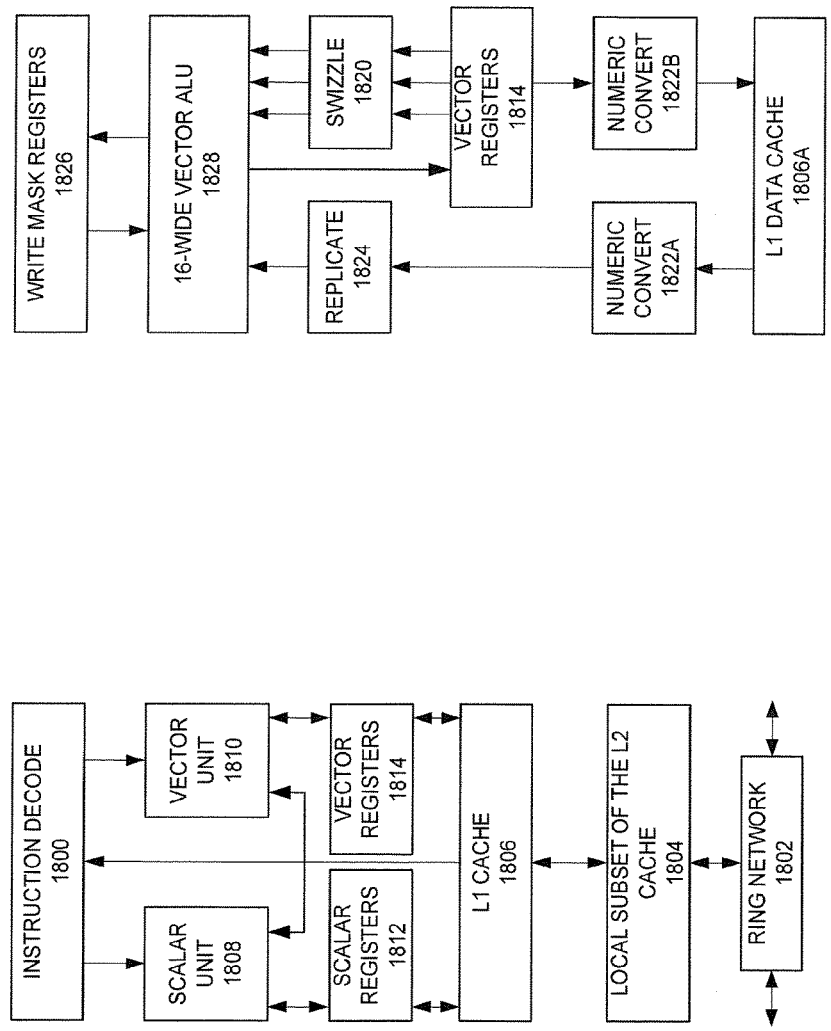
FIG. 18A is a block diagram of a single processor core, along with its connection to the on-die interconnect network and with its local subset of the Level 2 (L2) cache, according to embodiments of the invention.

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Processor with Integrated Memory Controller and Graphics

Figure 19:
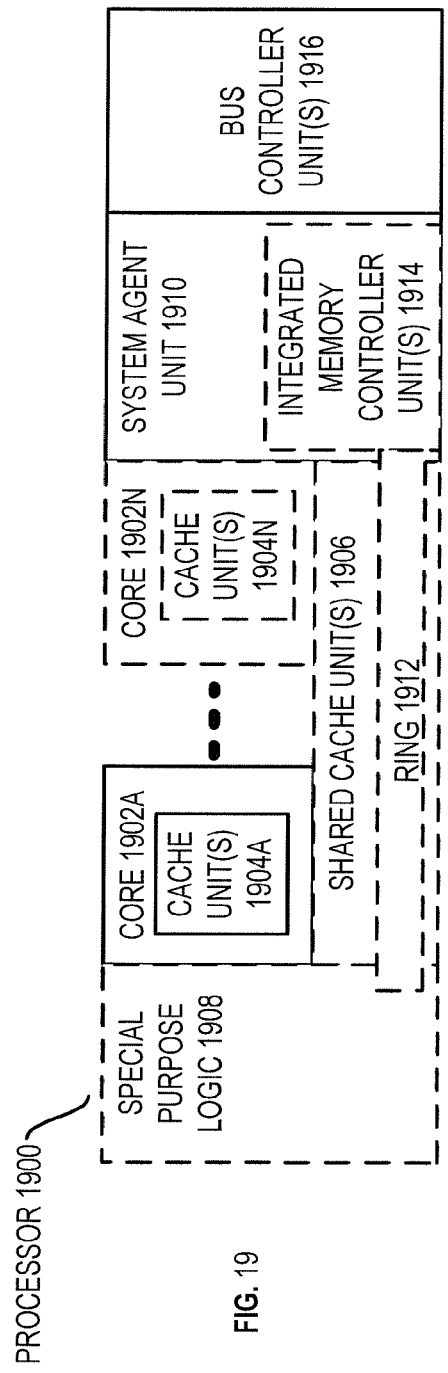
FIG. 19 is a block diagram of a processor that may have more than one core, may have an integrated memory controller, and may have integrated graphics according to embodiments of the invention.

FIG. 19 is a block diagram of a processor 1900 that may have more than one core, may have an integrated memory controller, and may have integrated graphics according to embodiments of the invention. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908, the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
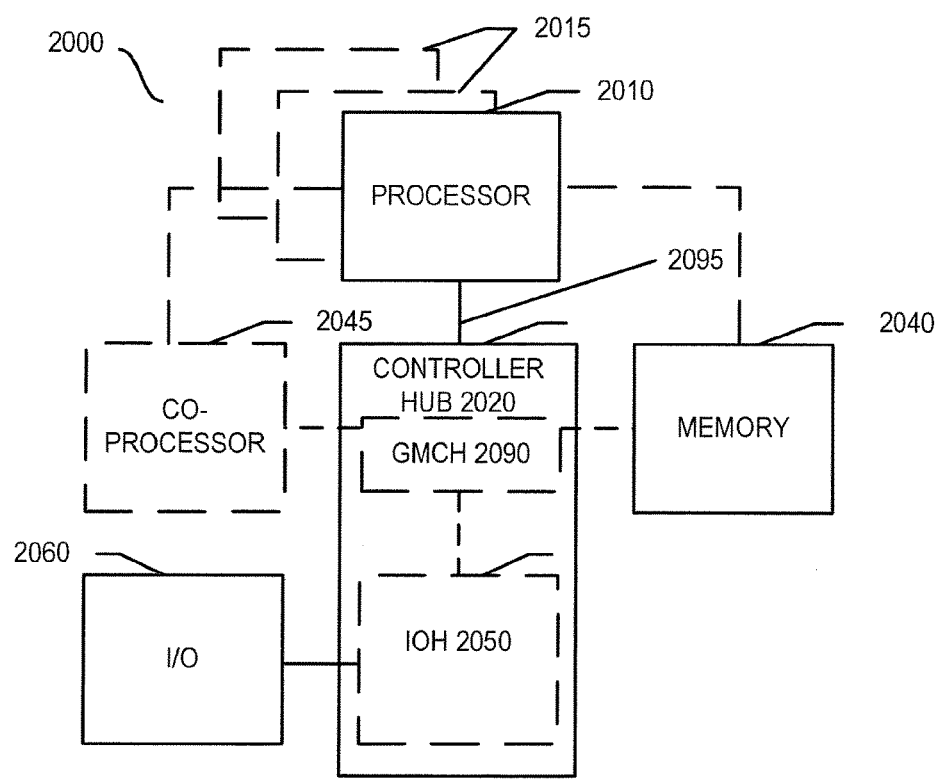
FIG. 20 shown is a block diagram of a system in accordance with one embodiment of the present invention.

Referring now to FIG. 20, shown is a block diagram of a system 2000 in accordance with one embodiment of the present invention. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 is couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
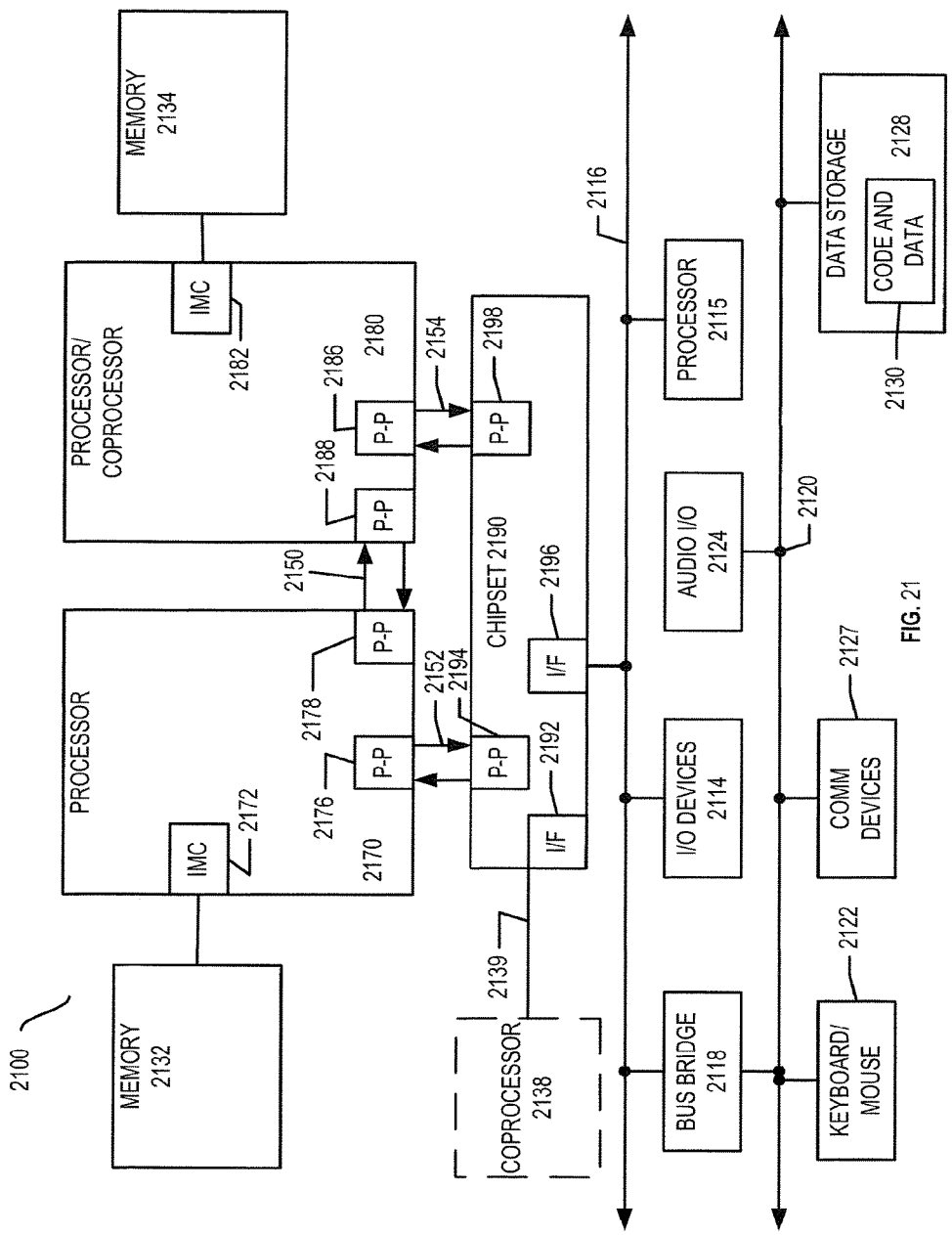
FIG. 21 shown is a block diagram of a first more specific exemplary system in accordance with an embodiment of the present invention.

Referring now to FIG. 21, shown is a block diagram of a first more specific exemplary system 2100 in accordance with an embodiment of the present invention. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the invention, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present invention is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
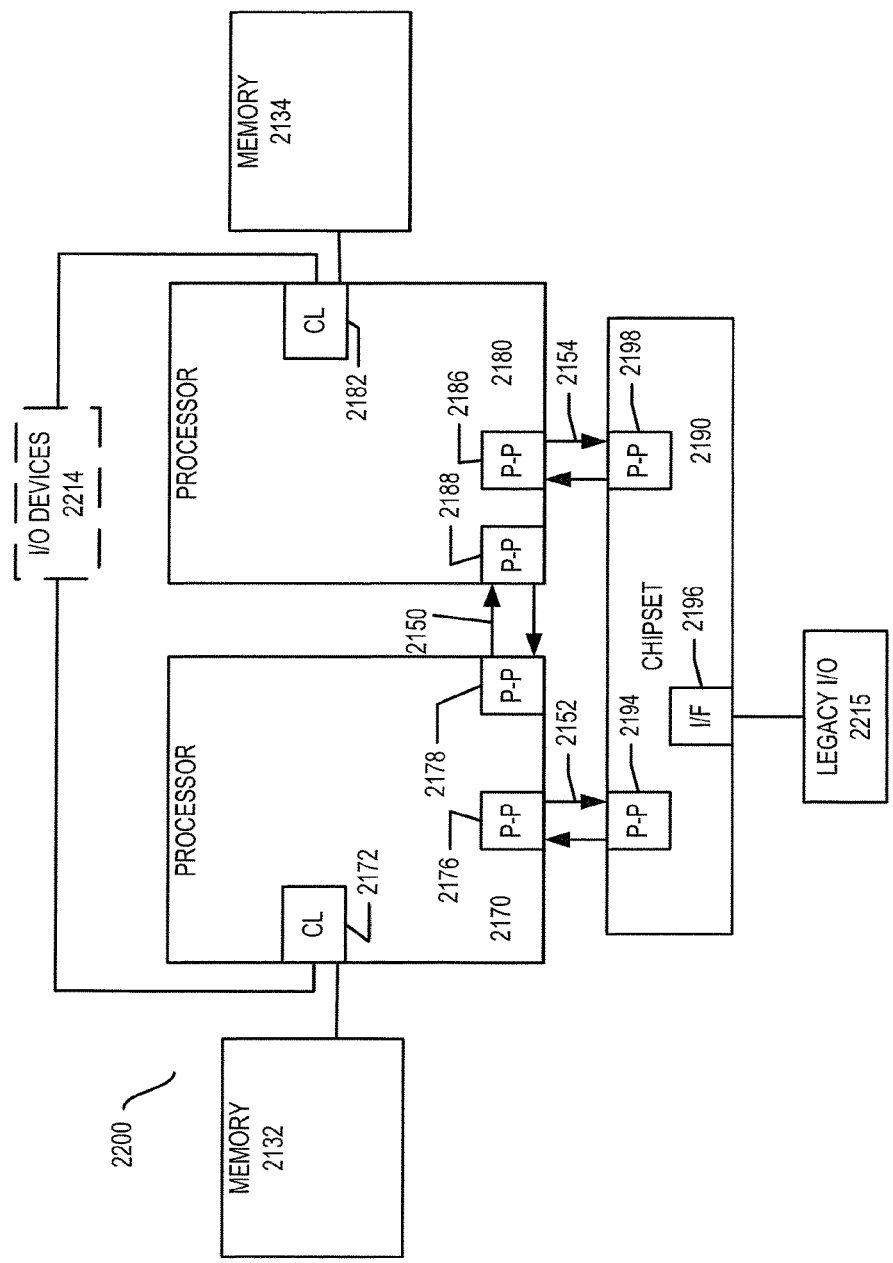
FIG. 22 shown is a block diagram of a second more specific exemplary system in accordance with an embodiment of the present invention.

Referring now to FIG. 22, shown is a block diagram of a second more specific exemplary system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
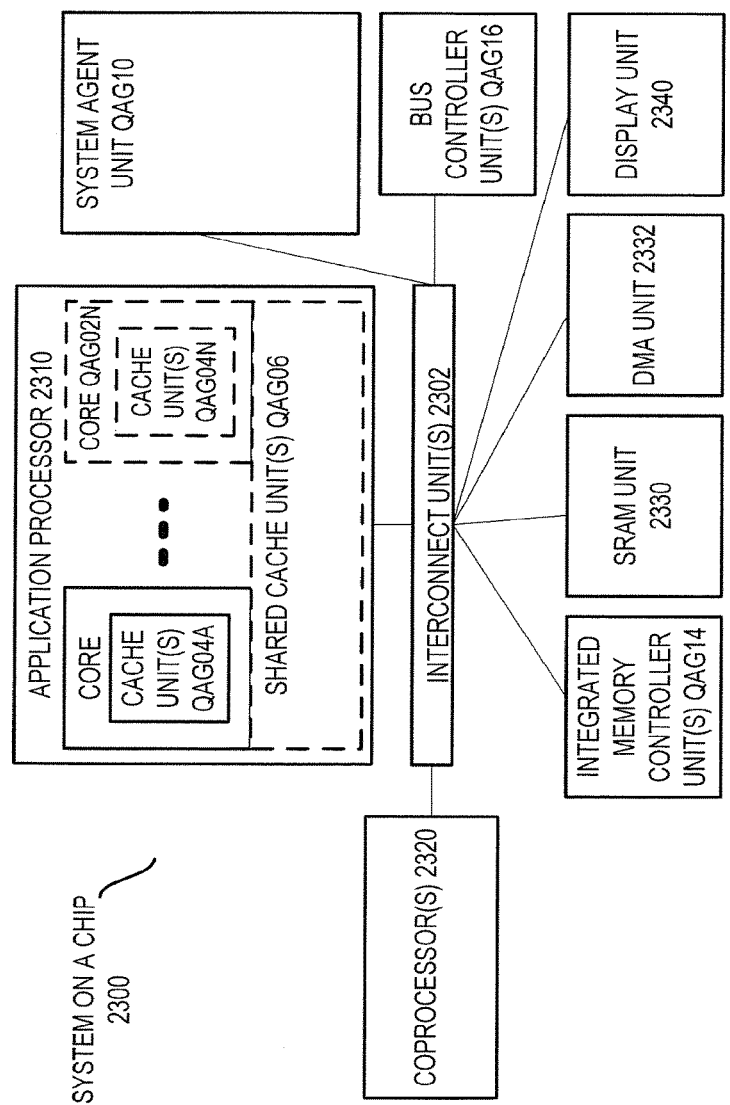
FIG. 23 shown is a block diagram of a SoC in accordance with an embodiment of the present invention.

Referring now to FIG. 23, shown is a block diagram of a SoC 2300 in accordance with an embodiment of the present invention. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 202A-N and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 24 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decoder through one or more intervening components. In the figures, arrows are used to show couplings and/or connections.

In the description and claims, the term "logic" may have been used. As used herein, the term logic may include hardware, firmware, software, or various combinations thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. Where a single component has been shown and described, in some cases this single component may be separated into two or more components.

Certain methods disclosed herein have been shown and described in a basic form, although operations may optionally be added to and/or removed from the methods. In addition, a particular order of the operations may have been shown and/or described, although alternate embodiments may perform certain operations in different order, combine certain operations, overlap certain operations, etc.

Certain operations may be performed by hardware components and/or may be embodied in a machine-executable or circuit-executable instruction that may be used to cause and/or result in a hardware component (e.g., a processor, potion of a processor, circuit, etc.) programmed with the instruction performing the operations. The hardware component may include a general-purpose or special-purpose hardware component. The operations may be performed by a combination of hardware, software, and/or firmware. The hardware component may include specific or particular logic (e.g., circuitry potentially combined with software and/or firmware) that is operable to execute and/or process the instruction and store a result in response to the instruction (e.g., in response to one or more microinstructions or other control signals derived from the instruction).

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
a plurality of packed data registers;
a decode unit to decode a packed rotate instruction that is to indicate a first source packed data that is to include a plurality of data elements, that is to indicate a second source single data element that is to represent a rotation amount, and that is to indicate a destination packed data register of the plurality of packed data registers; and
an execution unit coupled with the plurality of the packed data registers and coupled with the decode unit, the execution unit operable, in response to the decode of the packed rotate instruction, to store a result packed data in the destination packed data register, the result packed data to include a plurality of result data elements, in which each of the result data elements is to include one of the data elements of the first source packed data in a corresponding position that is to have been rotated by a corresponding broadcasted replica of the second source single data element that is to represent the rotation amount.

2. The processor of claim 1, wherein the decode unit is to decode the packed rotate instruction that is to indicate a packed data operation mask that is to have a plurality of mask elements.

3. The processor of claim 2, wherein each mask element is a single bit.

4. The processor of claim 1, wherein the decode unit is to decode the packed rotate instruction that is to indicate the second source single data element in memory.

5. The processor of claim 1, wherein the decode unit is to decode the packed rotate instruction that is to indicate the second source single data element which is to be a 64-bit data element, and wherein the execution unit is operable, in response to the decode of the packed rotate instruction, to store the result packed data that is to include at least four result data elements, and wherein the result data elements each comprise at least 64-bits.

6. The processor of claim 1, wherein the decode unit is to decode the packed rotate instruction that is to indicate the second source single data element which is to be a 32-bit data element, and wherein the execution unit is operable, in response to the decode of the packed rotate instruction, to store the result packed data that is to include at least sixteen result data elements, and wherein the result data elements each comprise at least 32-bits.

7. The processor of claim 1, wherein each of the packed data registers has at least 512-bits.

8. An apparatus comprising:
a plurality of packed data registers;
a decode unit to decode a packed rotate instruction that is to indicate a first source packed data that is to include a plurality of data elements, that is to indicate a second source single data element that is to represent a rotation amount, and that is to indicate a destination storage location; and
an execution unit coupled with the plurality of the packed data registers and coupled with the decode unit, if the apparatus were operating, the execution unit operable, in response to the decode of the packed rotate instruction, to store a result packed data in the destination storage location, the result packed data to include a plurality of result data elements, in which each of the result data elements is to include one of the data elements of the first source packed data in a corresponding position that is to have been rotated by a corresponding broadcasted replica of the second source single data element that is to represent the rotation amount.

9. The apparatus of claim 8, wherein the execution unit is operable, in response to the decode of the packed rotate instruction, to store the result packed data that is to include at least sixteen result data elements, and wherein the result data elements each comprise at least 32-bits.

10. The apparatus of claim 8, wherein the execution unit is operable, in response to the decode of the packed rotate instruction, to store the result packed data that is to include at least four result data elements, and wherein the result data elements each comprise at least 64-bits.

11. The apparatus of claim 8, wherein each of the packed data registers has at least 256-bits.

12. The apparatus of claim 8, wherein the decode unit is to decode the packed rotate instruction that is to indicate the second source single data element in memory, and wherein the decode unit is to decode the packed rotate instruction that is to indicate a packed data operation mask that is to have a plurality of mask elements.

13. The apparatus of claim 12, wherein each of the mask elements is a single bit.

14. An apparatus comprising:
a plurality of packed data registers each able to store at least 128-bits;
a decode unit to decode a packed rotate instruction that is to indicate a first source packed data that is to include a plurality of data elements, that is to indicate a packed data operation mask that is to have a plurality of mask elements, that is to indicate a second source single data element that is to represent a rotation amount, and that is to indicate a destination packed data register of the plurality of packed data registers; and an execution unit coupled with the plurality of the packed data registers and coupled with the decode unit, if the apparatus were operating, the execution unit operable, in response to the decode of the packed rotate instruction, to store a result packed data in the destination packed data register, the result packed data to include a plurality of result data elements that are each to correspond to a different one of the mask elements in a corresponding relative position, in which each of the result data elements that is not masked out by the corresponding mask element is to include one of the data elements of the first source packed data in a corresponding position that is to have been rotated by a corresponding broadcasted replica of the second source single data element that is to represent the rotation amount, and in which each of the result data elements that is masked out by the corresponding mask element is to include a masked out value.

15. The apparatus of claim 14, wherein the decode unit is to decode the packed rotate instruction that is to indicate the second source single data element in memory.

16. The apparatus of claim 14, wherein each of the mask elements is a single bit.

17. The apparatus of claim 14, wherein the decode unit is to decode the packed rotate instruction that is to indicate the second source single data element which is to be a 64-bit data element, and wherein the execution unit is operable, in response to the decode of the packed rotate instruction, to store the result packed data that is to include at least four result data elements, and wherein the result data elements each comprise at least 64-bits.

18. The apparatus of claim 14, wherein the decode unit is to decode the packed rotate instruction that is to indicate the second source single data element which is to be a 32-bit data element, and wherein the execution unit is operable, in response to the decode of the packed rotate instruction, to store the result packed data that is to include at least sixteen result data elements, and wherein the result data elements each comprise at least 32-bits.

19. A system comprising:

an interconnect;

the apparatus of claim 14 coupled with the interconnect; and a dynamic random access memory coupled with the interconnect.

* * * * *